United States Patent
Gomez et al.

(10) Patent No.: US 10,831,733 B2
(45) Date of Patent: Nov. 10, 2020

(54) INTERACTIVE ADJUSTMENT OF DECISION RULES

(71) Applicant: International Business Machines Corporation, Armonk, NY (US)

(72) Inventors: Ana C. Gomez, Chicago, IL (US); Damir Spisic, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 15/853,564

(22) Filed: Dec. 22, 2017

(65) Prior Publication Data

US 2019/0197141 A1  Jun. 27, 2019

(51) Int. Cl.
*G06F 16/30* (2019.01)
*G06F 16/22* (2019.01)
*G06F 3/0482* (2013.01)
*G06N 5/02* (2006.01)
(Continued)

(52) U.S. Cl.
CPC ........ *G06F 16/2246* (2019.01); *G06F 3/0482* (2013.01); *G06F 16/24564* (2019.01); *G06F 16/24578* (2019.01); *G06N 5/025* (2013.01)

(58) Field of Classification Search
CPC .................................................. G06F 16/2246
See application file for complete search history.

(56) References Cited

U.S. PATENT DOCUMENTS 7,110,998 B1  9/2006  Bhandari et al.
7,873,651 B2  1/2011  Ono et al.
(Continued)

FOREIGN PATENT DOCUMENTS

CN  102214213 B  10/2011
CN  102306190 A   1/2012
CN  104765839 A   7/2015

OTHER PUBLICATIONS

YouTube video entitled "Watson Analytics: How to view decision rules and the decision tree", by IBM Analytics Learning Services, Uploaded on Dec. 21, 2015, available at https://www.youtube.com/watch?v=1k6RHzKUik4.*
English Abstract and Machine Translation for CN102214213, published on Oct. 12, 2011, Total 19 pp.
English Abstract and Machine Translation for CN102306190, published on Jan. 4, 2012, Total 27 pp.
(Continued)

*Primary Examiner* — Mahesh H Dwivedi
(74) *Attorney, Agent, or Firm* — Konrad Raynes Davda & Victor LLP; Janaki K. Davda

(57) ABSTRACT

Provided are techniques for interactive adjustment of decision rules. A modified decision rule with one or more decision rule conditions is received for adjusting an original decision tree, wherein at least one of the decision rule conditions has been modified. A decision rule condition that has been modified and a corresponding decision tree node of the original decision tree are selected. Data records from a database are selected for a parent node of the corresponding decision tree node. The selected data records that match the decision rule condition are filtered. A sub-tree is generated using the filtered data records with a first splitting variable from the modified decision rule condition. An original sub-tree is replaced with the generated sub-tree and the decision rule condition to form an adjusted decision tree. The adjusted decision tree is used to predict a value of a target variable based on available predictors.

20 Claims, 19 Drawing Sheets

(51) Int. Cl.
*G06F 16/2457* (2019.01)
*G06F 16/2455* (2019.01)

(56) References Cited

U.S. PATENT DOCUMENTS

| | | | |
|---|---|---|---|
| 8,250,008 B1 * | 8/2012 | Cao | G06Q 30/02 370/392 |
| 8,825,589 B2 | 9/2014 | Baudel et al. | |
| 2006/0047640 A1 * | 3/2006 | Ono | H04L 67/36 |
| 2007/0094060 A1 * | 4/2007 | Apps | G06Q 10/0637 705/7.36 |
| 2007/0219990 A1 * | 9/2007 | Crivat | G06F 16/283 |
| 2012/0239613 A1 * | 9/2012 | Danciu | G06Q 10/06 707/603 |
| 2013/0218853 A1 * | 8/2013 | Bullis | H04L 41/0816 707/694 |
| 2014/0324897 A1 * | 10/2014 | Ray | G06F 16/215 707/758 |
| 2017/0076214 A1 | 3/2017 | Spisic et al. | |
| 2018/0268306 A1 * | 9/2018 | Laine | G06F 21/6254 |

OTHER PUBLICATIONS

English Abstract and Machine Translation for CN104765839, published on Jul. 8, 2015, Total 10 pp.

Kahng, M., D. Fang, and D.H. Chau, "Visual Exploration of Machine Learning Results Using Data Cube Analysis", Hilda'16, Jun. 26, 2016, San Francisco, CA, USA, © 2016 ACM. ISBN 978-1-4503-4207-0/16/06, Total 6 pp.

Van Den Elzen, S.J. and J.J. Van Wijk, "BaobabView: Interactive Construction and Analysis of Decision Trees", Proceedings IEEE Symposium on Visual Analytics Science and Technology (VAST 2011, Providence, RI, USA, Oct. 23-28, 2011), DOI:10.1109/VAST. 2011.6102453, Published: Jan. 1, 2011, Total 11 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Sep. 2011, Computer Security Division Information Technology Laboratory National Institute of Standards and Technology, Total 7 pp.

* cited by examiner

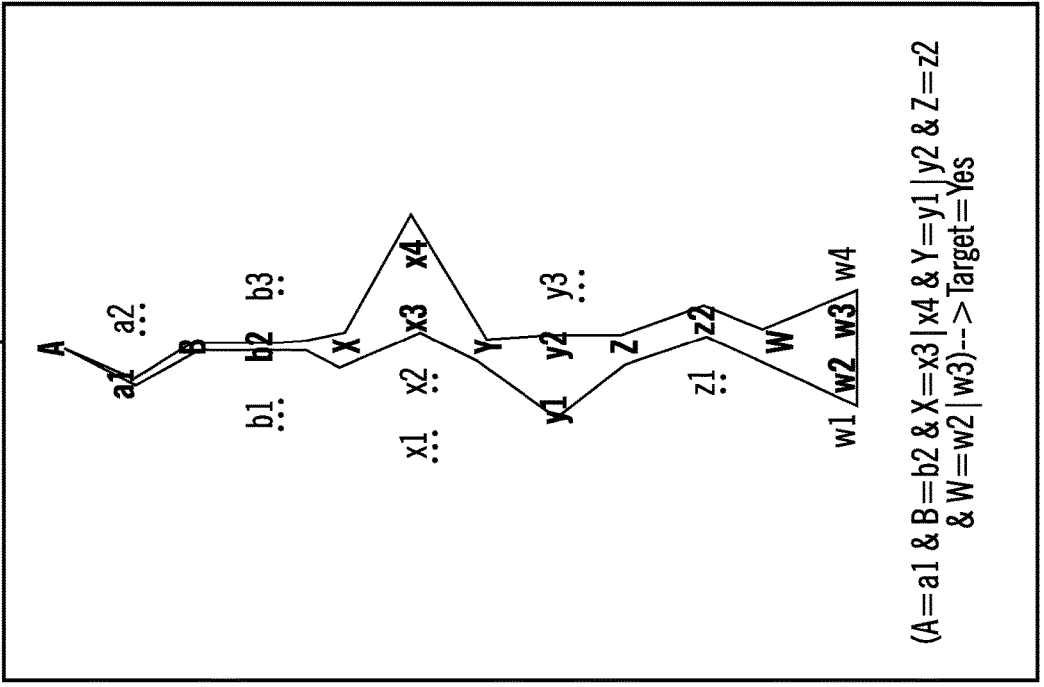
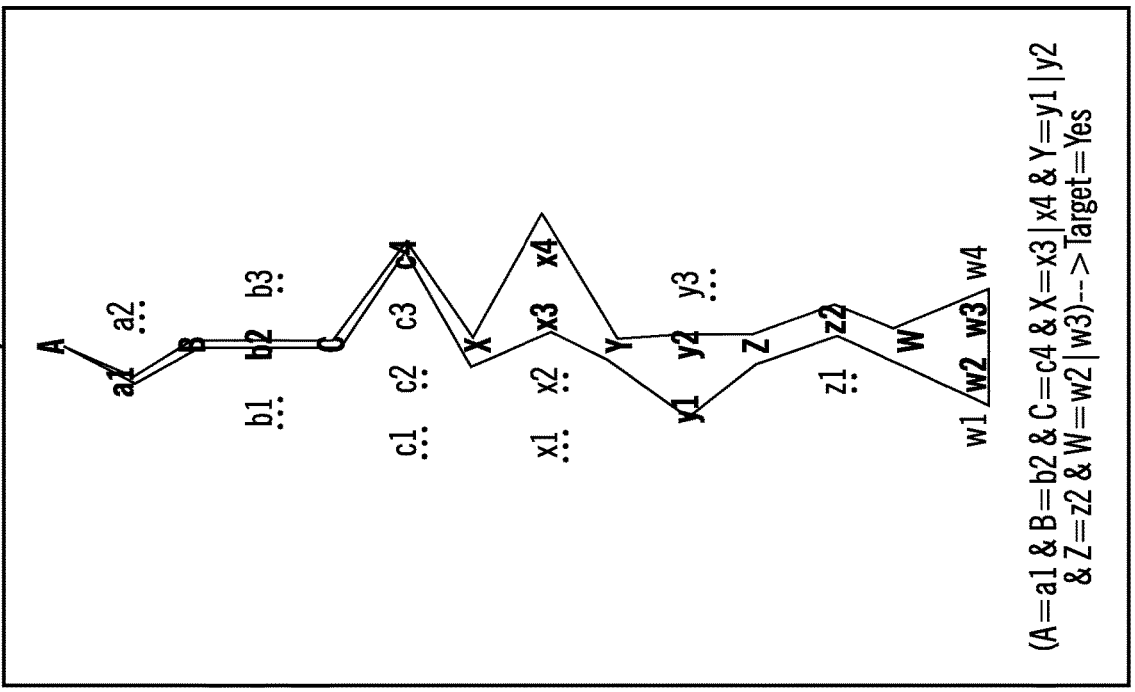
FIG. 3

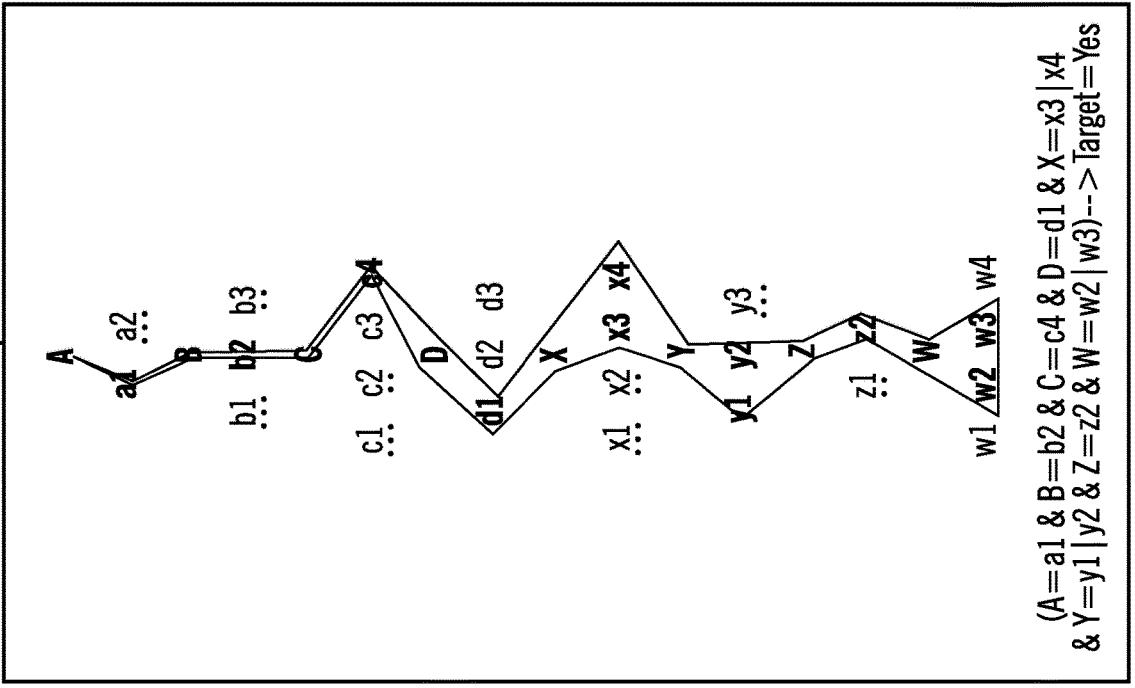
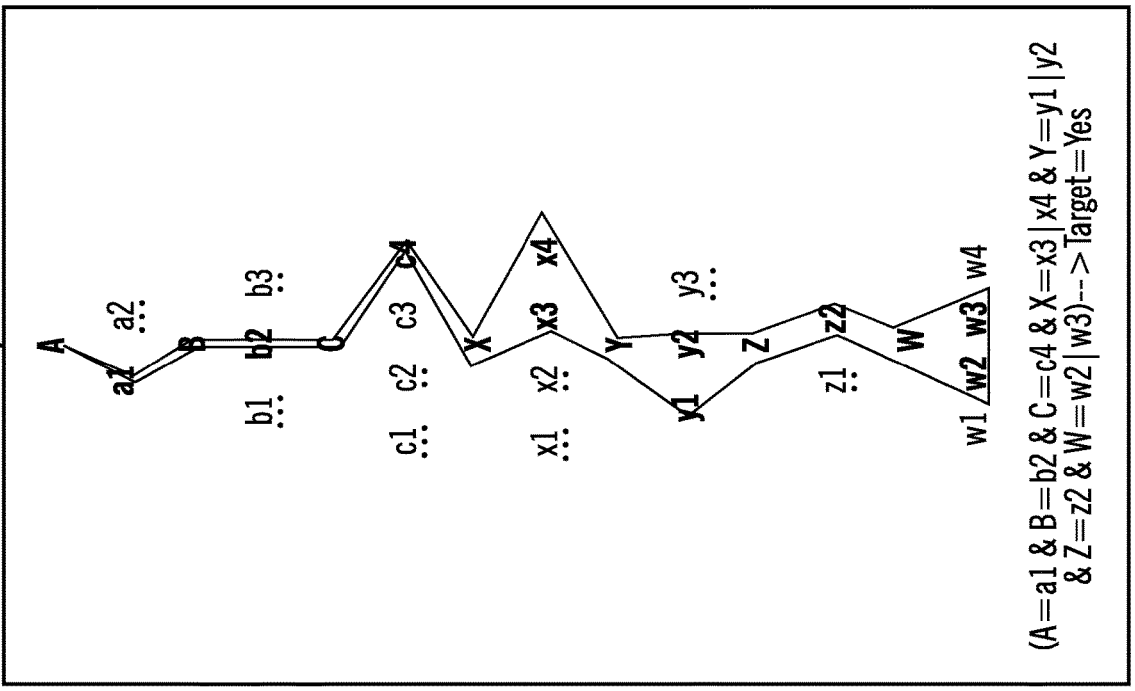
FIG. 4

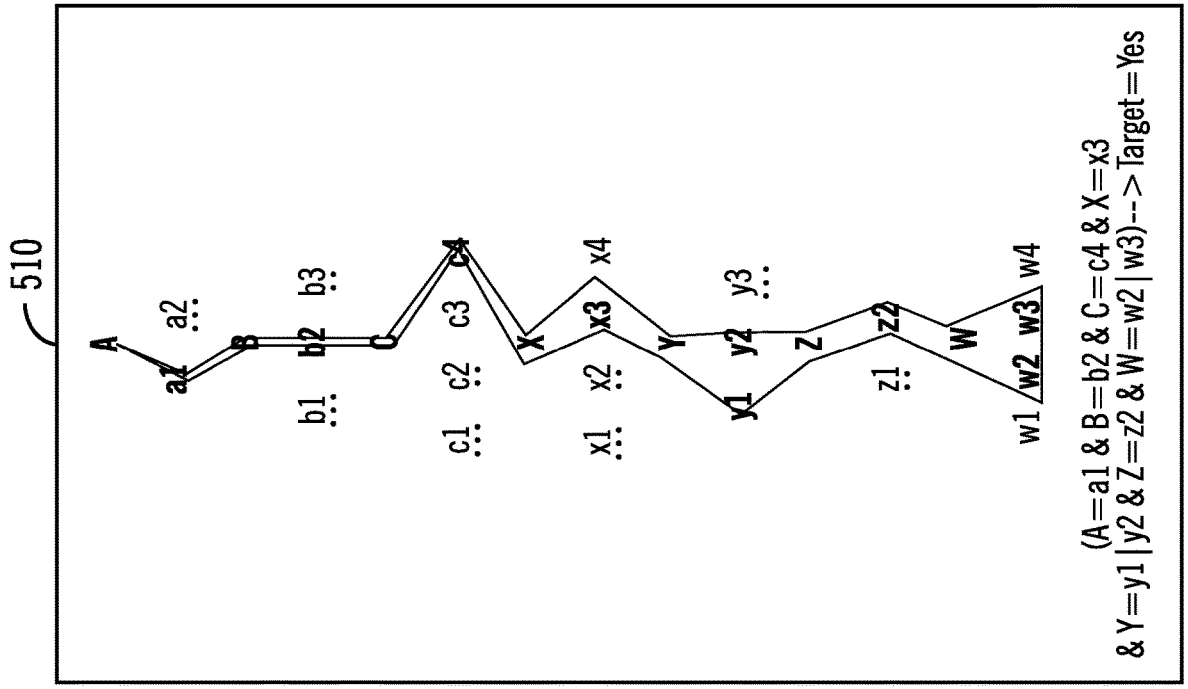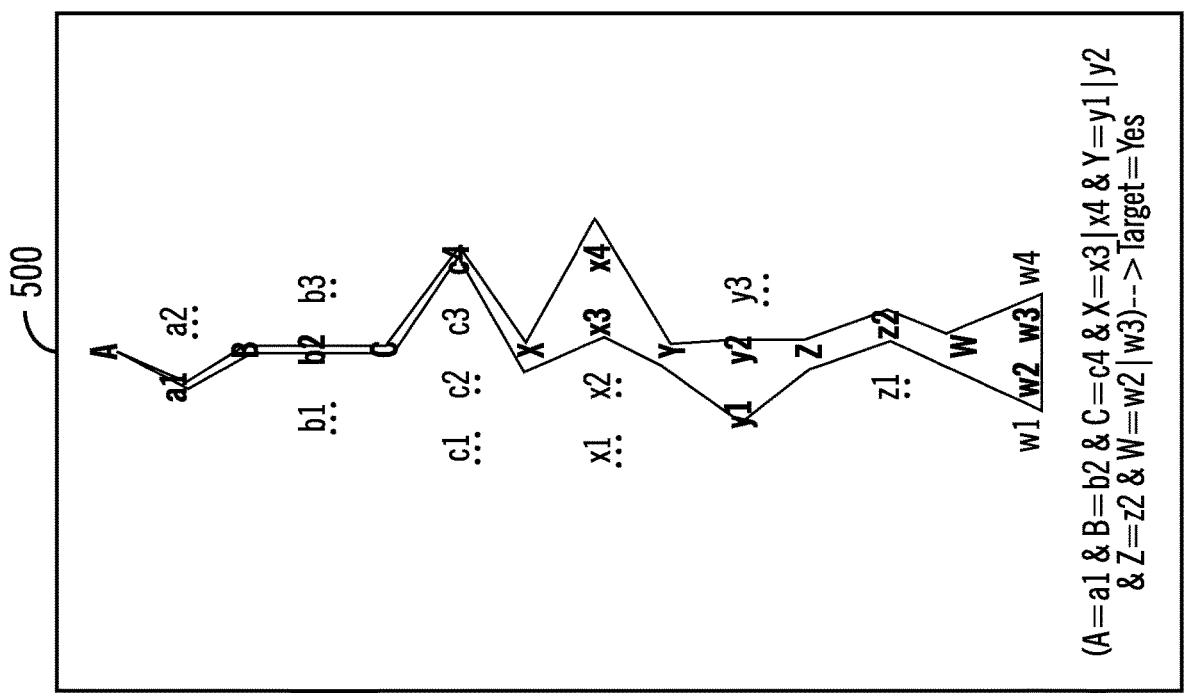
FIG. 5

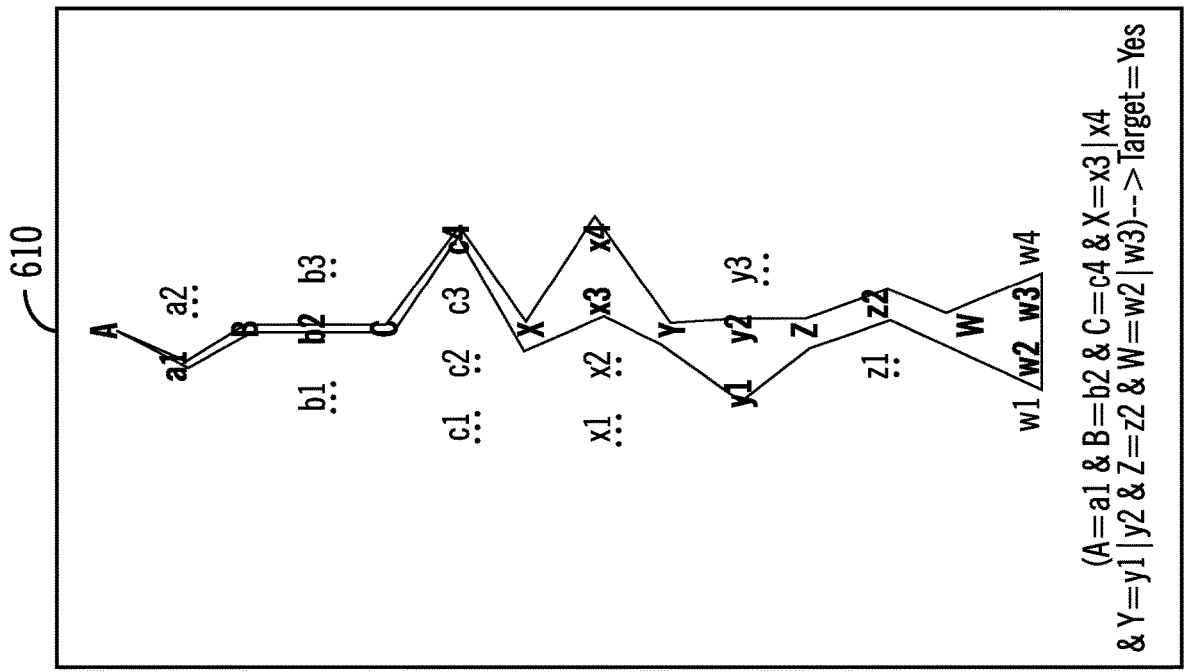
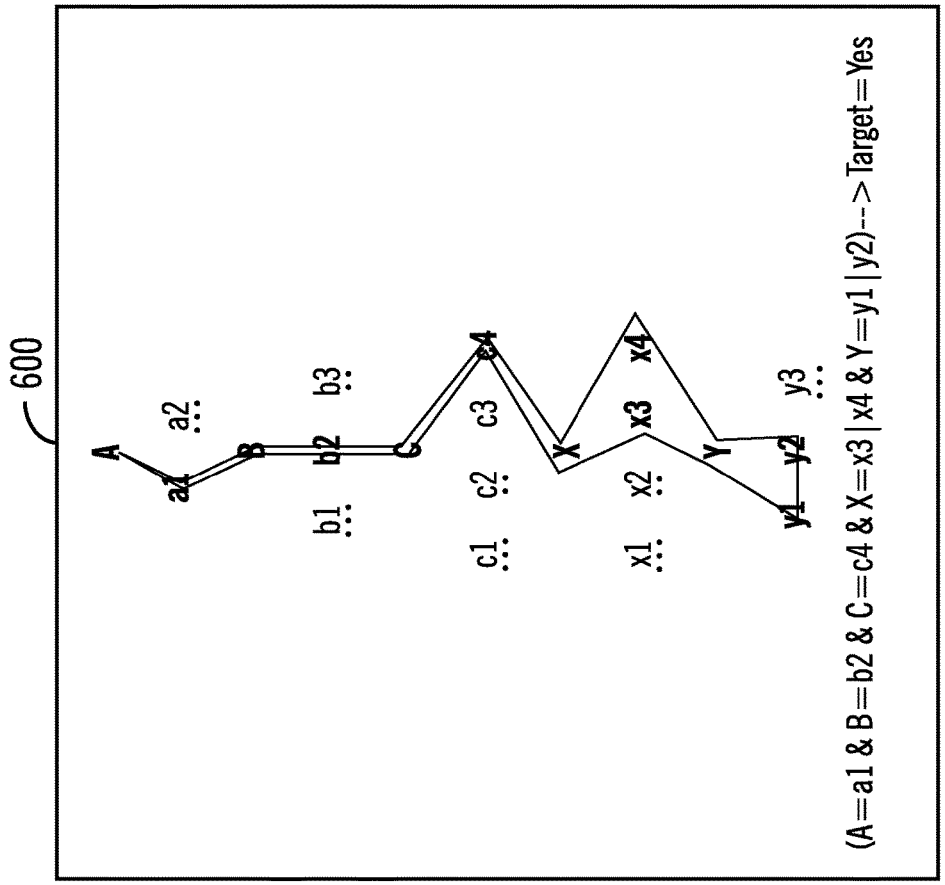
FIG. 6

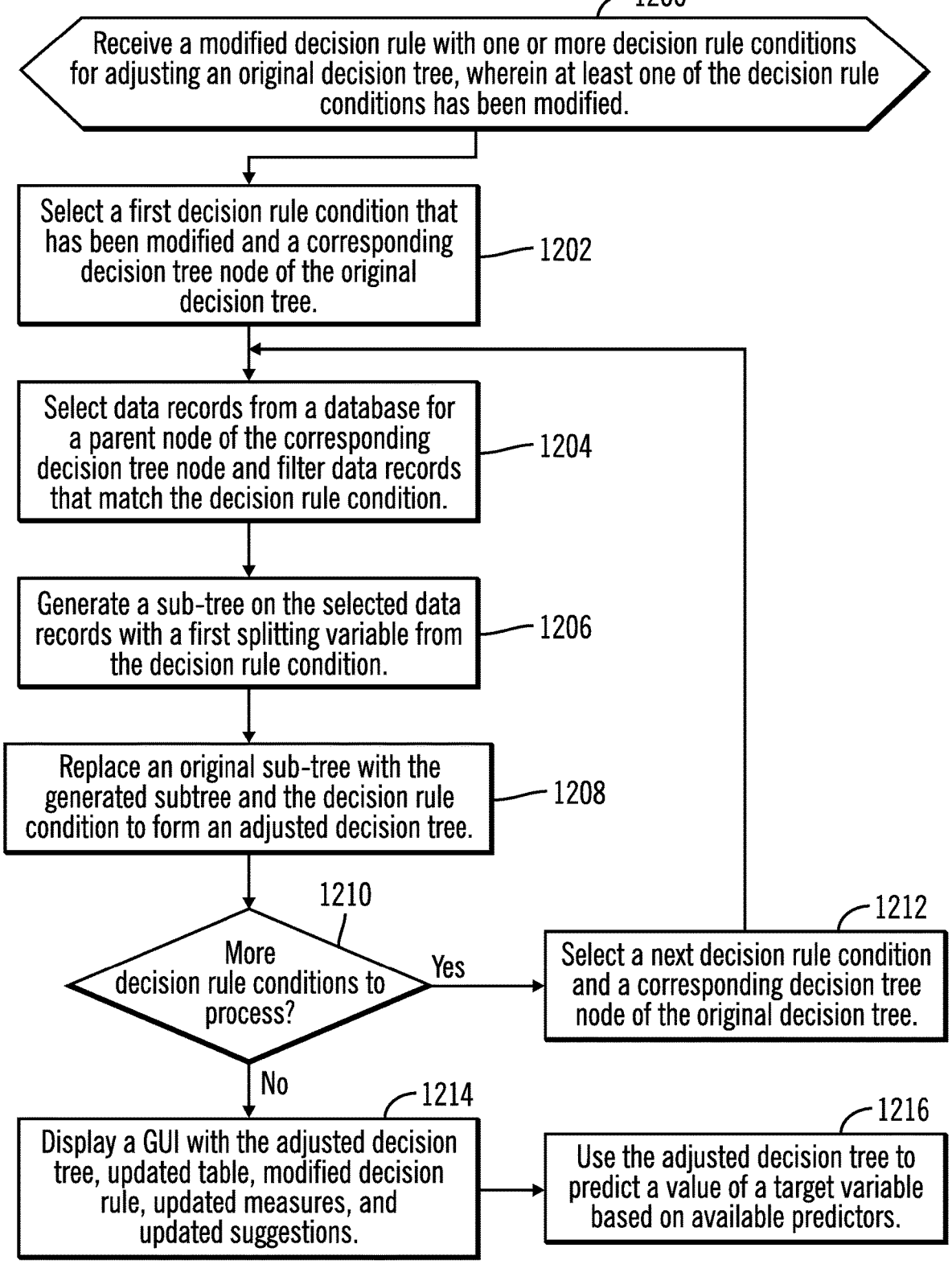

INTERACTIVE ADJUSTMENT OF DECISION RULES

FIELD

Embodiments of the invention relate to interactive adjustment of decision rules.

BACKGROUND

Decision trees are powerful tools to analyze and visually display statistical test outcomes. Decision trees may be generated by a number of different techniques in machine learning. Often, decision trees are used to extract and apply decision rules corresponding to a decision tree node. These decision rules are fixed and reflect one of a large number of alternatives. In an ideal world, the decision rules would be made actionable and be applied specifically to the user's industry. However, in reality, many times the decision rules do not fit a users' purposes or dictate doing things that are out of the user's (or human) control. In other words, there are limitations that are implicit to a domain or current operations that may render the decisions rules inapplicable for a user.

In conventional systems, users adjust the decision rules by changing the set of attributes and categories that define the decision rules and then rebuilding a model. With conventional systems, this is a laborious process that requires data science knowledge and includes: generating a large number of alternatives, computing appropriate summaries, and identifying the adjustments that are both effective and fit the user's goals.

Some conventional systems allow for interactive building of decision trees, while imposing limitations when adjusting relevant decision rules. In order to adjust a decision rule at a specific attribute condition, all subsequent conditions in the decision rule need to be removed. They can only be recovered by manually adding them back through interactive decision tree building, while the rest of affected tree branches need to be specified for automatic rebuilding. Moreover, users may only view alternative categories and adjust them for a single decision rule condition at a time.

Other conventional systems consider possible automated adjustments to the given decision rule. This is considered in a purely Structured Query Language (SQL) query context and does not support adjustments to the corresponding decision tree model.

Another conventional system uses a correlation matrix that allows for visualizing joint effects of two selected attributes. This evaluates various predictive models on different data subsets.

Conventional systems for generating and comparing a large number of decision rule adjustments are both inefficient and offer no help when making choices suitable for the user's needs.

SUMMARY

In accordance with embodiments, a computer-implemented method is provided for interactive adjustment of decision rules. The computer-implemented method comprises: receiving, using a processor of a computer, a modified decision rule with one or more decision rule conditions for adjusting an original decision tree, wherein at least one of the decision rule conditions has been modified; selecting a decision rule condition that has been modified and a corresponding decision tree node of the original decision tree; selecting data records from a database for a parent node of the corresponding decision tree node; filtering the selected data records that match the decision rule condition; generating a sub-tree using the filtered data records with a first splitting variable from the modified decision rule condition; replacing an original sub-tree with the generated sub-tree and the decision rule condition to form an adjusted decision tree; and using the adjusted decision tree to predict a value of a target variable based on available predictors.

In accordance with other embodiments, a computer program product is provided for interactive adjustment of decision rules. The computer program product comprising a computer readable storage medium having program code embodied therewith, the program code executable by at least one processor to perform operations comprising: receiving a modified decision rule with one or more decision rule conditions for adjusting an original decision tree, wherein at least one of the decision rule conditions has been modified; selecting a decision rule condition that has been modified and a corresponding decision tree node of the original decision tree; selecting data records from a database for a parent node of the corresponding decision tree node; filtering the selected data records that match the decision rule condition; generating a sub-tree using the filtered data records with a first splitting variable from the modified decision rule condition; replacing an original sub-tree with the generated sub-tree and the decision rule condition to form an adjusted decision tree; and using the adjusted decision tree to predict a value of a target variable based on available predictors.

In yet other embodiments, a computer system is provided for interactive adjustment of decision rules. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving a modified decision rule with one or more decision rule conditions for adjusting an original decision tree, wherein at least one of the decision rule conditions has been modified; selecting a decision rule condition that has been modified and a corresponding decision tree node of the original decision tree; selecting data records from a database for a parent node of the corresponding decision tree node; filtering the selected data records that match the decision rule condition; generating a sub-tree using the filtered data records with a first splitting variable from the modified decision rule condition; replacing an original sub-tree with the generated sub-tree and the decision rule condition to form an adjusted decision tree; and using the adjusted decision tree to predict a value of a target variable based on available predictors.

BRIEF DESCRIPTION OF THE SEVERAL VIEWS OF THE DRAWINGS

Referring now to the drawings in which like reference numbers represent corresponding parts throughout:

FIG. 3 illustrates removing a decision rule condition in accordance with certain embodiments.

FIG. 4 illustrates inserting a decision rule condition in accordance with certain embodiments.

FIG. 5 illustrates adjusting a decision rule condition in accordance with certain embodiments.

FIG. 6 illustrates extending a decision rule condition in accordance with certain embodiments.

FIGS. 11A, 11B, 11C, 11D, and 11E illustrate interactive decision rule adjustment in accordance with certain embodiments.

FIG. 12 illustrates, in a flow chart, operations for providing suggestions in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments allow a user to exert control over which levers are in play for a given decision rule and adjust the decision rules as needed. This is a benefit that is not available in traditional decision trees. With embodiments, the levers may be different user criteria and may be optimal, opportunistic, domain based, etc. Embodiments provide an interactive system in which users may visualize decision rule details, including alternatives related to a single or a pair of attributes that are statistically favorable, and may interactively adjust the decision rule as needed.

Embodiments allow users to adjust the decision tree by looking at rules and applying restrictions and/or experimenting with other possibilities based on prior knowledge or assumptions regarding the domain. Embodiments allow users to do this interactively, without having to rebuild the decision tree. Thus, with embodiments, users need not be data miners or data scientists to accomplish this task.

Embodiments allow users to inspect joint alternatives for two conditions and related set of rules in the decision tree to help the user make more accurate and more suitable choices. Embodiments enable interactive selection of desired choices enhanced by automated discovery of an optimal choice for two selected attributes.

Embodiments provide flexible adjustment to decision rules, while maintaining a decision tree model. This gives users a chance to adjust rules of interest and obtain a consistent decision tree model.

Figure 1:
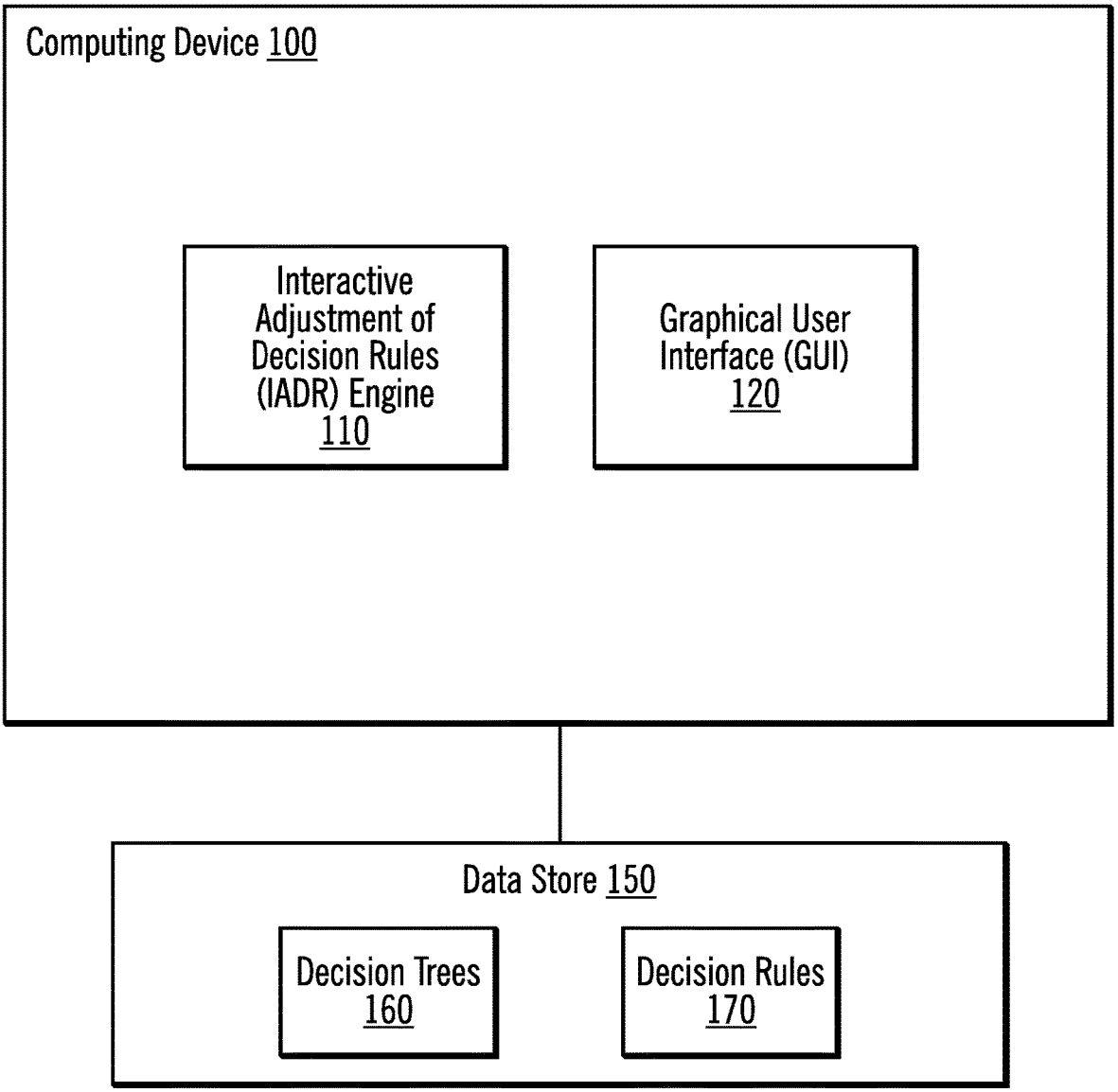
FIG. 1 illustrates, in a block diagram, a computing environment in accordance with certain embodiments.

FIG. 1 illustrates, in a block diagram, a computing environment in accordance with certain embodiments. In FIG. 1, a computing system 100 includes an Interactive Adjustment of Decision Rules (IADR) engine 110 and a Graphical User Interface (GUI) 120. The computing system 120 is coupled to a data store 150. The data store 150 stores decision trees 160 and decision rules 170.

The IADR engine 110 couples predictive modeling and insider knowledge of the user to create informed decision trees that leverage the strengths and value of both. The IADR engine 110 makes it easy for the user to visualize details of generated decision rules for any pair of involved attributes and allow interactive rule adjustments. Embodiments consist of two parts: the IADR engine 110 that is able to recalculate the decision tree and the GUI 120 that allows control over a variable pair for the chosen decision rule. The IADR engine 110 and the GUI 120 work together to provide a visual indication of recommended alternatives to consider, as well as, visual tools to adjust the decision rules and view relevant consequences.

The IADR engine 110 allows a user to intuitively and easily add industry knowledge and other constraints, which are unknown to the IADR engine 110, into the decision tree model, so that the obtained results are of direct value.

Decision trees are popular predictive models that have good prediction accuracy but also offer direct insights in the form of decision rules. A decision tree may be built by different decision techniques. Embodiments use techniques in which the attributes are all categorical (or binned continuous data), multi-way node splits are supported, and a target variable is either categorical or continuous. Attributes may be described as categorical predictors. Multi-way node splits may be described as splitting data at a node that is not restricted to two groups. Attribute categories may be merged into three or more groups for the purpose of splitting a node. A target variable may be described as a field that is predicted or influenced by one or more predictors. A categorical target variable may be described as having a finite number of nominal or ordinal categories as values. A continuous target variable may be described as having any numerical value.

A decision rule may be described as a logic predicate of the form: if antecedent then consequent. An antecedent is specified as a conjunction of attribute-based conditions in which each attribute is assigned a subset of values from its domain. A consequent describes a decision based on the distribution of the target variable, conditional on the antecedent. An example of an antecedent is (A=a1, B=b3, C=c2) where A, B and C are attributes and a1, b3, and c2 are the corresponding attribute values. An example of a consequent is given by (average(T)=17.5). The corresponding decision rule is then the following: (A=a1, B=b3, C=c2)=>(T=17.5)) With embodiments, a decision rule is used for prediction, while an average of a continuous target may be used as the prediction value. Therefore, the average is about constructing prediction, while the value is about its application.

In certain embodiments, decision trees are used to obtain insights in the form of decision rules. A complete set of disjoint decision rules may be extracted from a decision tree. Each decision rule corresponds to a full path or branch in the decision tree. Every node in the tree branch matches an attribute, and together with a node split, specifies a condition in the decision rule. The assigned value in the leaf node corresponds to the rule consequent.

Figure 2:
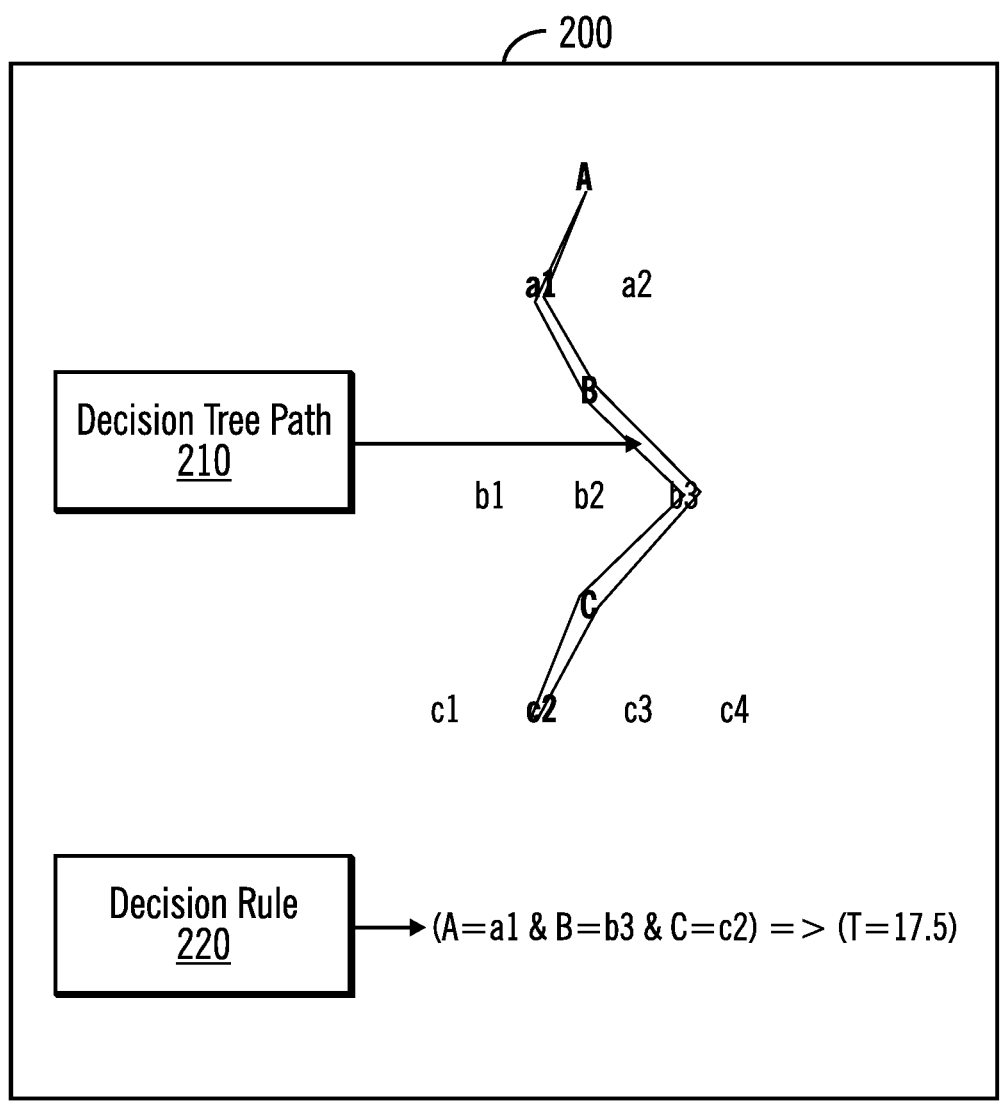
FIG. 2 illustrates an example decision tree in accordance with certain embodiments.

FIG. 2 illustrates an example decision tree 200 in accordance with certain embodiments. The decision tree path 210 is A-a1-B-b3-C-c2. The decision rule 220 is (A=a1 & B=b3 & C=c2)=>(Target=17.5).

With embodiments, decision rules obtained from the decision tree are ranked by particular criteria of interest and displayed to the user. This allows the user to gain important insights about important subgroups and corresponding relationships in the data from these decision rules. However, the decision rules may include attributes that are expensive to gather or cannot be controlled for new data, or there are conditions that are not directly suitable or convenient for application. Moreover, the decision rules may not match the domain knowledge that is desirable to be applied as part of the decision rule, as well as, the corresponding decision tree (can domain knowledge be specified. Embodiments provide automated building of decision trees using specified domain knowledge in the form of constraints. Embodiments also enable interactive adjustment, where both domain knowledge and subjective/opportunistic reasoning may be influential.

The IADR engine 110 allows users to directly adjust the obtained decision rules and propagate the adjustments to the corresponding decision tree. The IADR engine 110 allows the following operations for explicit antecedent adjustments for a given decision rule: remove a decision rule condition, insert a decision rule condition, adjust a decision rule condition, and extend a decision rule condition.

FIG. 3 illustrates removing a decision rule condition for a decision tree 300 in accordance with certain embodiments. In FIG. 3, the decision rule condition C=c4 is removed from decision tree 300, which results in decision tree 310. The decision rule for decision tree 300 is: (A=a1 & B=b2 & C=c4 & X=x3|x4 & Y=y1|y2 & Z=z2 & W=w2|w3)=>Target=Yes. The decision rule for decision tree 310, after C=c4 is removed, is: (A=a1 & B=b2 & X=x3|x4 & Y=y1|y2 & Z=z2 & W=w2|w3)=>Target=Yes. Removing a decision rule condition removes a condition from the decision rule antecedent. The consequence for the decision tree 310 is that the sub-tree starting with attribute C, corresponding to the removed decision rule condition C=c4, is removed from the decision tree 310. This is replaced by a new sub-tree starting with attribute X, corresponding to the subsequent decision rule condition X=x3|x4. The rest of the decision rule is preserved as a branch in the new sub-tree.

FIG. 4 illustrates inserting a decision rule condition into a decision tree 400 in accordance with certain embodiments. In FIG. 4, the decision rule condition D=d1 is inserted into decision tree 400, which results in decision tree 410. The decision rule for decision tree 400 is: A=a1 & B=b2 & C=c4 & X=x3|x4 & Y=y1|y2 & Z=z2 & W=w2|w3)=>Target=Yes. The decision rule for decision tree 410 is: A=a1 & B=b2 & C=c4 & D=d1 & X=x3|x4 & Y=y1|y2 & Z=z2 & W=w2|w3)=>Target=Yes. Inserting the decision rule condition D=d1 to the decision tree 400 adds a new node, shown in decision tree 410, and pushes down the sub-decision tree matching the conditions below the inserted condition. Other branches for node D are generated by the IADR engine 110, as well as, all new branches for the nodes below the inserted condition. The branch corresponding to the kept decision rule conditions is preserved intact.

FIG. 5 illustrates adjusting a decision rule condition in accordance with certain embodiments. In FIG. 5, the decision rule condition X=x3|x4 is adjusted to X=x3. The decision rule for decision tree 500 is: (A=a1 & B=b2 & C=c4 & X=x3|x4 & Y=y1|y2 & Z=z2 & W=w2|w3)=>Target=Yes. The decision rule for decision tree 510, after X=x3|x4 is adjusted to X=x3, is: (A=a1 & B=b2 & X=x3 & Y=y1|y2 & Z=z2 & W=w2|w3)=>Target=Yes. Adjusting decision rule condition X=x3|x4 to X=x3 defines a new branch in the decision tree 510, starting with attribute X. Other branches for attribute X are generated by the IADR engine 110, as well as, all new branches for the nodes below the adjusted condition.

Operations for removing, inserting or adjusting a decision rule condition are intrinsic decision rule adjustment operations. With embodiments, they require decision tree restructuring and optimal (or interactive) adjustment for the related decision tree branches. The outcome is an updated decision rule and consistent decision tree with minimal and optimal decision tree alterations.

FIG. 6 illustrates extending a decision rule condition in accordance with certain embodiments. In FIG. 6, the decision tree 600 is extended by adding the decision rule conditions Z=z2 and W=w2|w3. The decision rule for decision tree 610 is: (A=a1 & B=b2 & C=c4 & X=x3|x4 & Y=y1|y2)=>Target=Yes. The decision rule for decision tree 610, after X=x3|x4 is adjusted to X=x3, is: (A=a1 & B=b2 & C=c4 & X=x3|x4 & Y=y1|y2 & Z=z2 & W=w2|w3)=>Target=Yes. Extending a decision rule may be applied after removing one or more conditions from the bottom of the decision rule. This is about automatic (or interactive) extension of the preserved part of the decision rule. This corresponds to an interactive decision tree building operation where each node is expanded either by the IADR engine 110 or interactively, by the user, one at a time. The consequent of the decision rule is adjusted according to the decision tree technique used by the IADR engine 110. The decision rule antecedent determines a matching set of data records, which in turn define the target distribution and the corresponding decision rule consequent.

The IADR engine 110 allows specifying a set of decision rules. With embodiments, the user may select up to two attributes in a branch and focus on the set of decision rules that are related to those two attributes. Merely for examples herein, the first selected attribute in the decision rule is denoted by X, and the second attribute is denoted by Y.

There may be multiple decision rules in a decision tree related to attributes X and Y having the same set of conditions C, e.g. C=(A=a1, B=b2, C=c4). Embodiments allow jointly adjusting the decision rules with the set of conditions C that additionally involve attributes X and Y.

For this example, denote the set of all decision rules related to X and Y by R(C,X,Y). There is a constrained set C=(S, T, U), where S is a set of fixed constraints preceding X; T is set of constraints between X and Y; and U is set of constraints after Y. Sets of constraints S, T and U may include any attribute in the data set and corresponding values, except for the attributes X and Y. While constraint S may be defined as a sequence of conditions that apply to all decision rules in the specified set, such constraint is overly restrictive for T and U. For T and U, embodiments typically apply a sequence of conditions to a particular decision rule from the original set of rules. Alternatively, embodiments may consider applying different constraint sequences to different decision rules and restrict decision rule adjustments where conflicts would occur. Still another option is to consider a fixed set of attributes for constraints T and U, but allow different conditions using these attributes for different rules. With embodiments, for interactive decision tree building, constraints S that correspond to the splits above X are retained. Constraints U may be recomputed after adjusting X and Y. Embodiments allow keeping any subset of the initial constraints, as well as, selecting a subset of adjusted decision rules after automatic extension.

Figure 7:
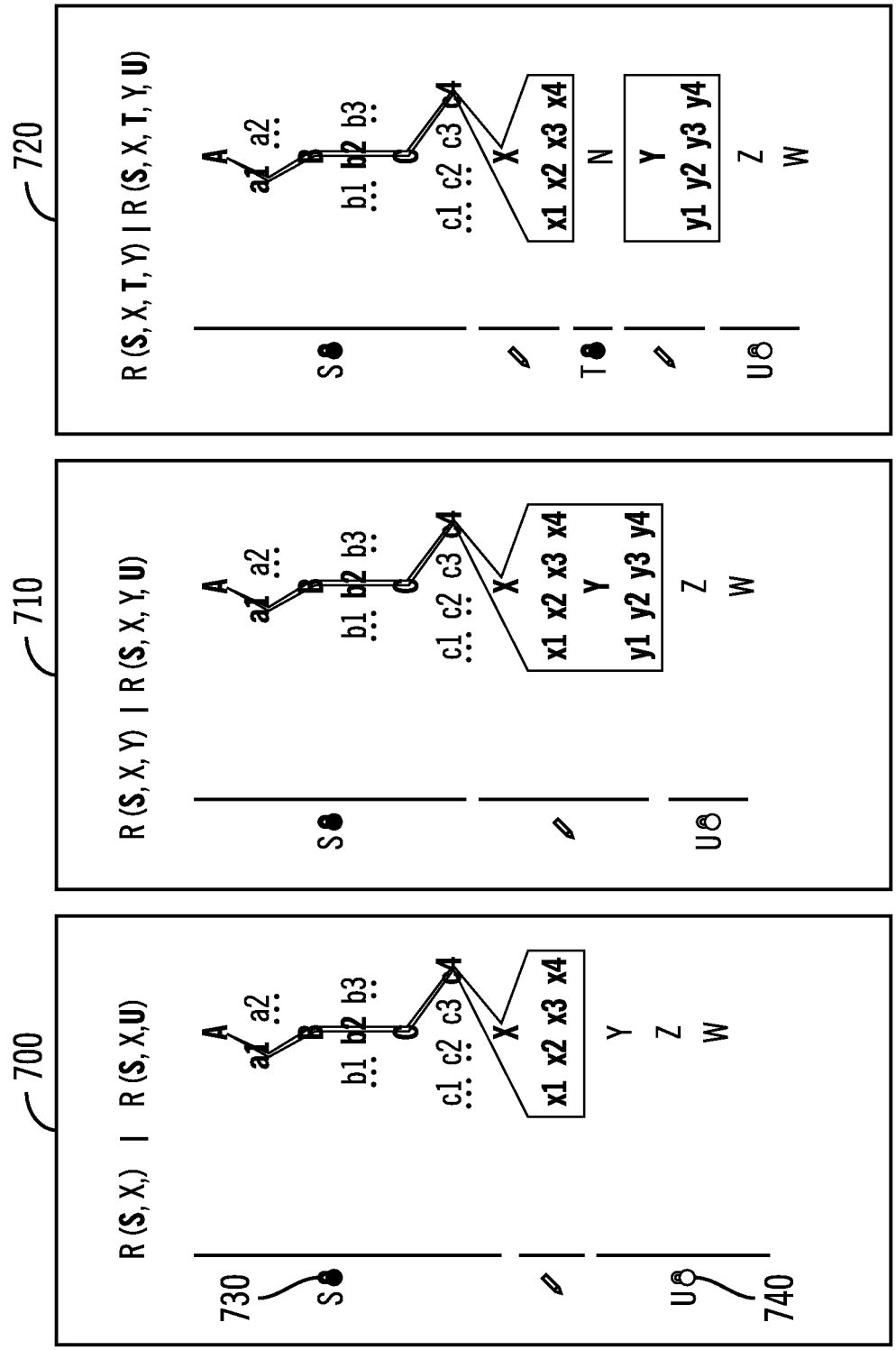
FIG. 7 illustrates specifying a set of rules in accordance with certain embodiments.

FIG. 7 illustrates specifying a set of rules in accordance with certain embodiments. Decision tree 700 illustrates R(S, X)|R(S, X, U). Decision tree 700 includes attributes Y, Z and W. Decision tree 710 illustrates R(S, X, Y)|R(S, X, Y, U). In decision tree 710, as compared to decision tree 700, attribute Y is added under X. Decision tree 720 illustrates R(S, X, T, Y)|R(S, X, T, Y, U). In decision tree 720, as compared to decision tree 710, constraint T is added, including attribute N. FIG. 7 illustrates a lock status 730 and an unlock status 740. With embodiments, the status of locked and unlocked is about a condition being active or not. For example, condition U may be locked (active) or unlocked (absent or not active).

Unlike conventional systems for interactive decision trees that only consider selecting and splitting X for R(S, X), embodiments allow splitting X and Y jointly to provide additional control and flexibility to the user, as well as, a chance to generate a more optimal set of decision rules. Coupled with the adjustment operation in which conditions in T and U may be retained, embodiments obtain a complete solution for interactive decision rules adjustment that also maintains a consistent decision tree.

Embodiments also consider the following scenario: R(S, X, Y) that focuses on the interactive decision rule adjustment using two attributes jointly. This may be extended to other, more complex, use cases accordingly.

Figure 8:
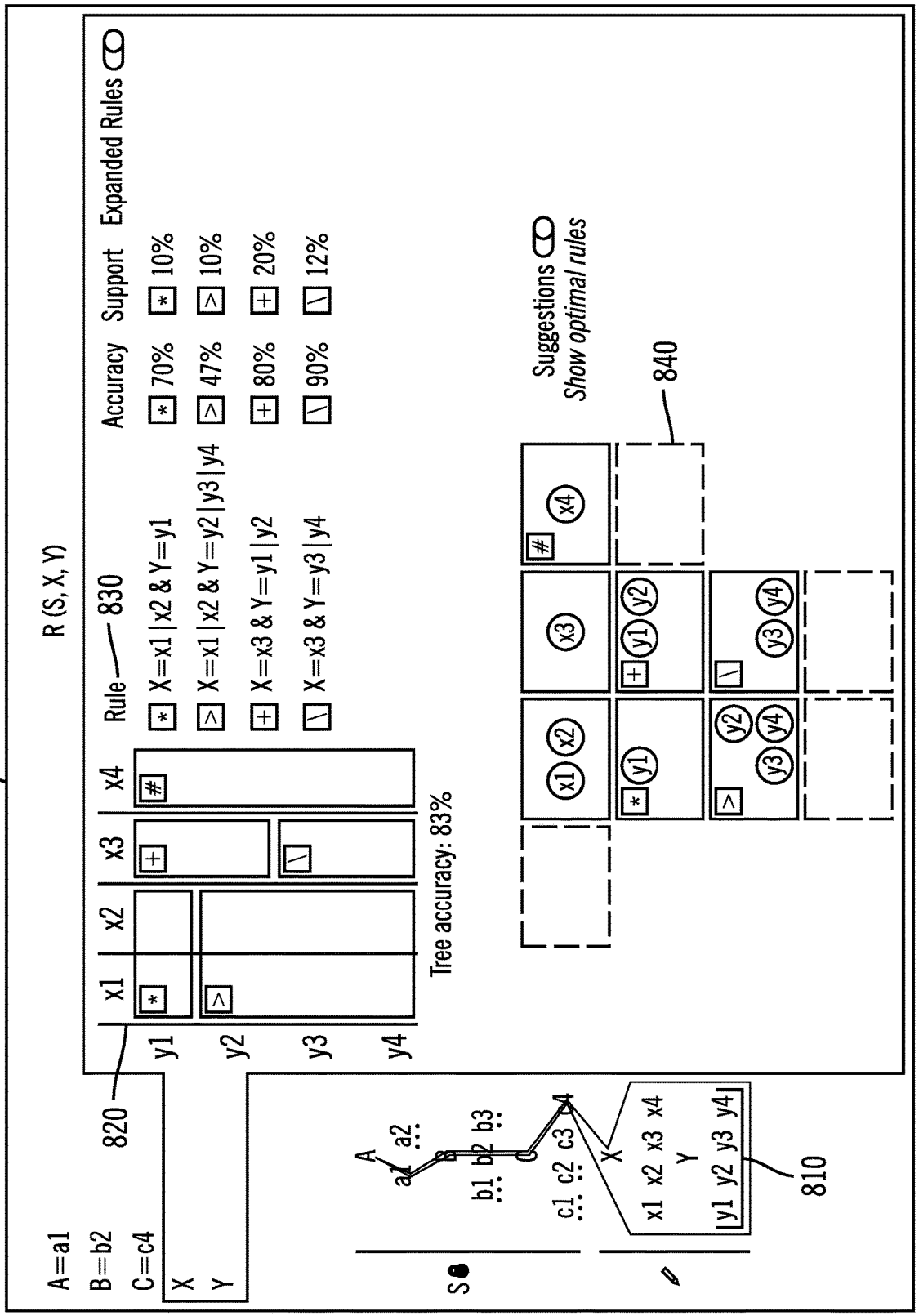
FIG. 8 illustrates an example interactive display in accordance with certain embodiments.

The IADR engine 110 provides the GUI 120 to allow for decision rule set adjustment using a visual tool. FIG. 8 illustrates an example interactive GUI 800 in accordance with certain embodiments. With this example, given a set of constraints S, the interactive GUI 800 illustrates how two variables X and Y define a set of decision rules R(S, X, Y) in the decision tree 810 and interact in a two-dimensional table 820. The interactive GUI 800 lets the user make adjustments. The path leading to X is intact, meaning the attributes involved remain split according to the original condition S. For simplicity, this example assumes that there are no conditions between X and Y (i.e., T contains no attributes) and that the conditions after attribute Y are allowed to be adjusted automatically by the system (i.e., U is unlocked).

With embodiments, the table 820 displays decision rules. Each cell or group of cells in the table represents a particular decision rule from the set R(S, X, Y). The user may re-specify the decision rules by adjusting one or more groupings of cells in the table 820. A rule column (table legend) 830 provides a list of the decision rules and relevant decision rule measures. Measures may be described as summary statistics For example, the decision rule measures include a support measure for the decision rule (i.e., a proportion of the subjects that belong to the decision rule) and measures for the target, such as accuracy, average, distribution, etc. With embodiments, the same metrics are provided for every decision rule in the table and indicated through color, shading, shape, etc. to provide a visual understanding of the decision rules. Also, the IADR engine 110 provides suggestions 840 for adjusting the decision rules. With embodiments, the suggestions are based on domain knowledge (e.g., a marketing domain, a health domain, etc.), based on opportunistic factors, etc.

Figure 9:
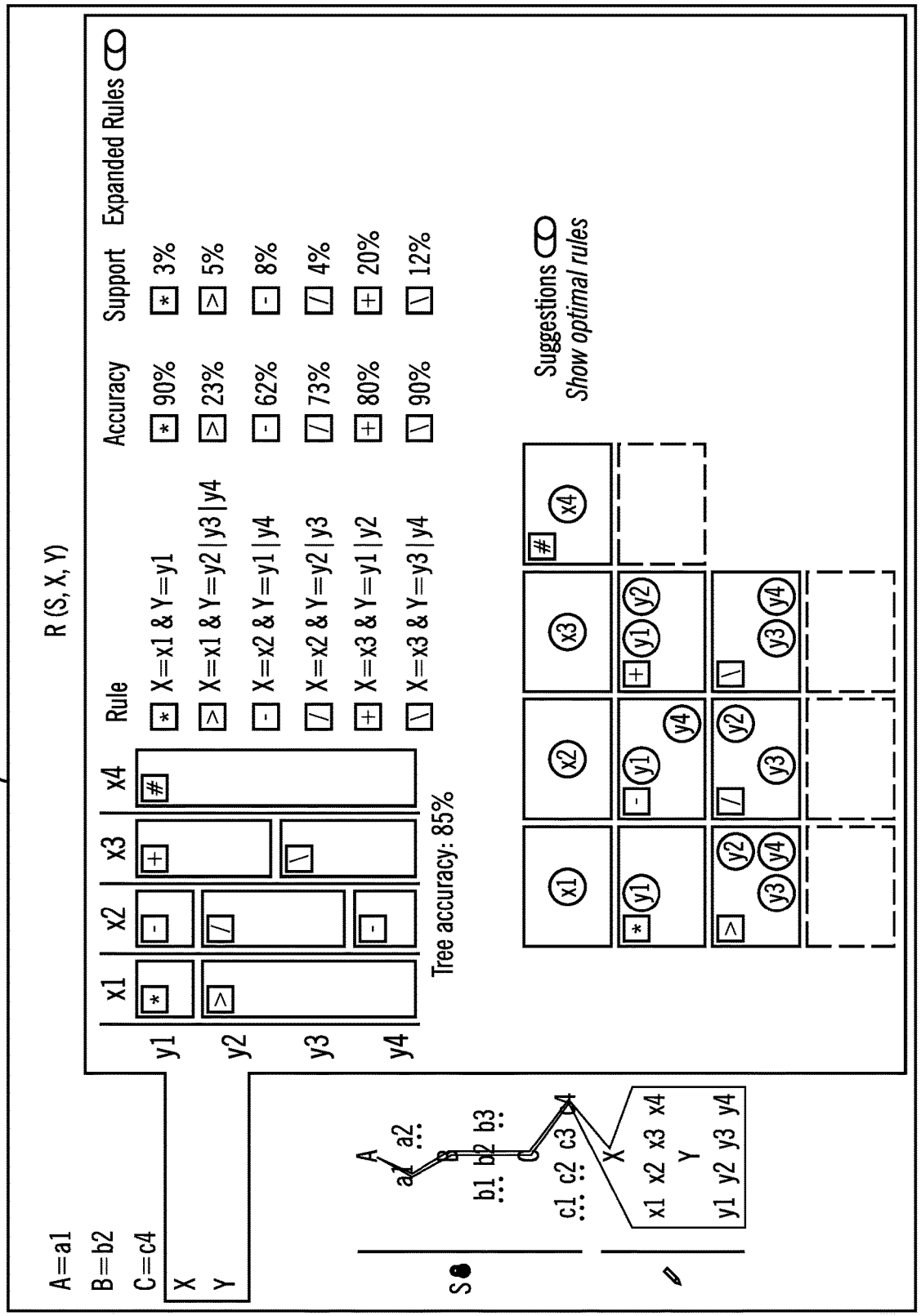
FIG. 9 illustrates another example interactive display in accordance with certain embodiments.

FIG. 9 illustrates another example interactive GUI 900 in accordance with certain embodiments. The user may want to adjust the decision rules by reconfiguring the default groups, by merging, or by splitting grouped cells in the table. FIG. 9 shows an example in which a user has activated an optimal set of decision rules when considering the two attributes jointly to replace the original set of decision rules. While the user may have some pre-existing scenarios in mind, the user may also approach this opportunistically—looking to create decision rules that are more convenient for the given purpose and, at the same time, control the quality of the decision rules through the measures.

With embodiments, there are some constraints to grouping cells into a decision rule that are inherent due to the decision tree structure and its technique of creating decision rules. Because X is the first attribute in the path, merging categories or splitting groups of X influences the set of feasible options for the second attribute Y. The following are constraint types that are considered:

Categories of X are merged. If x1 and x2 as categories are merged, any decision rule that involves a particular category of Y applies to both x1 and x2.

Category of X is not split by Y. This has a consequence that there are no decision rules corresponding to that category of X. This is indicated by an empty corresponding column in the table.

For each set of decision rules, the IADR engine 110 provides suggestions for an optimal set of decision rules for two attributes jointly. Certain embodiments consider optimal merging of Y categories separately for each category X. After that, rules for different X categories are evaluated for merging. This improves over the tree building process where categories of X are merged first, with no regard for categories of Y present in the next split.

On the other hand, the user may interactively impose restrictions and is allowed to make any changes according to the constraints discussed above. A combination of user interaction ability to assess the current decision rules as well as suggested adjustments provides a complete and efficient technique for adjusting the decision rules according to desired goals.

Figure 10:
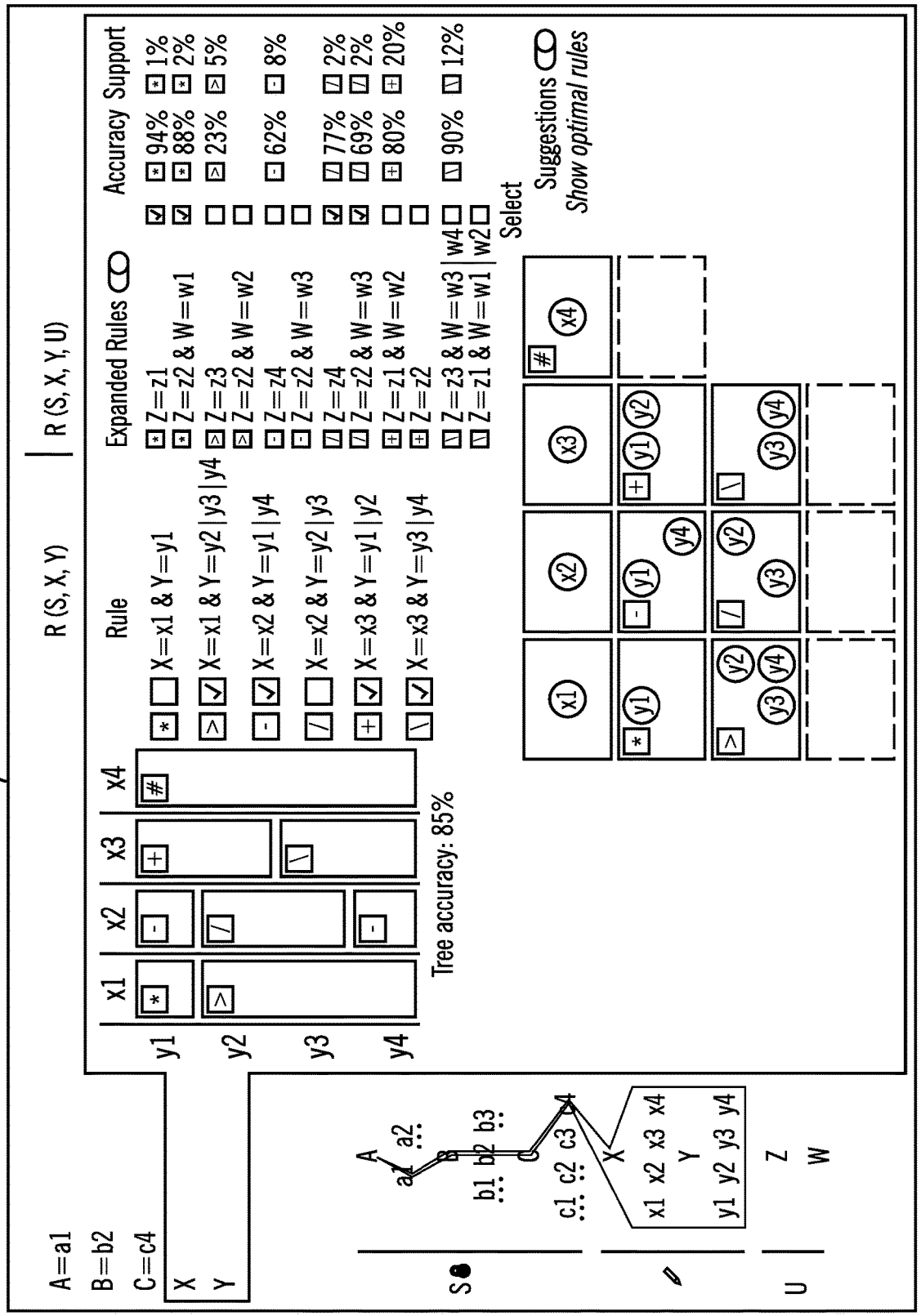
FIG. 10 illustrates an example interactive display for an expanding set of decision rules in accordance with certain embodiments.

FIG. 10 illustrates an example interactive GUI 1000 for an expanding set of decision rules in accordance with certain embodiments. After the initial set of decision rules R(S, X, Y) is adjusted, the set of decision rules may be automatically expanded in a set of the format R(S, X, Y, U). The user may then select a desired set of disjoint original or expanded decision rules. The final selection is used to adjust the decision tree. In this manner, overall decision tree accuracy, as well as, the change from initial measure is provided by embodiments.

Decision rules sets of the form R(S, X, T, Y) and R(S, X, T, Y, U) may be adjusted operations for single decision rule adjustments.

FIGS. 11A, 11B, 11C, 11D, and 11E illustrate interactive decision rule adjustment in accordance with certain embodiments. The user may interactively adjust the decision rules by reconfiguring the default groups, by merging, or by splitting grouping cells in the table. For example, starting with table 1100 of FIG. 11A, the IADR engine 110 has split X into three groups or categories, x1|x2, x3 and x4. However, the user may know that x1|x2 is not a feasible or convenient grouping and decide to split the group and see what result the IADR engine 110 provides.

In FIG. 11B, images 1a 1110 and 1b 1120 illustrate that the splitting of x1|x2 results in a corresponding split in the Y variable, creating two new decision rules. For this example, the first two decision rules 1122 in the rule column of image 1b 1120 are new. The next two decision rules are originally present in image 1a 1110, but they are adjusted in image 1b 1120. The associated decision rules indicate measures, including the accuracy and support percentages, in the decision rule set adjustment.

In FIG. 11C, images 2a 1130 and 2b 1140 illustrate that a split of Y grouping y2|y3 under X=x2 creates one additional decision rule 1142, which is decision rule X=x2 and Y=y3 is new. The light blue rule X=x2 & Y=y2 has been adjusted.

Figure 11A:
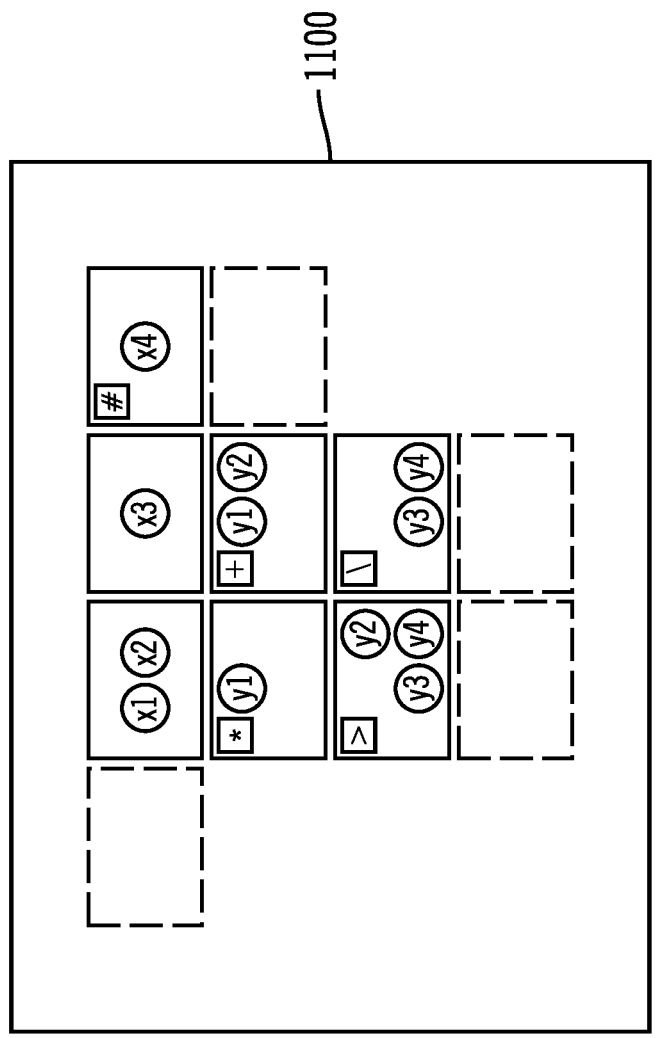
Figure 11B:
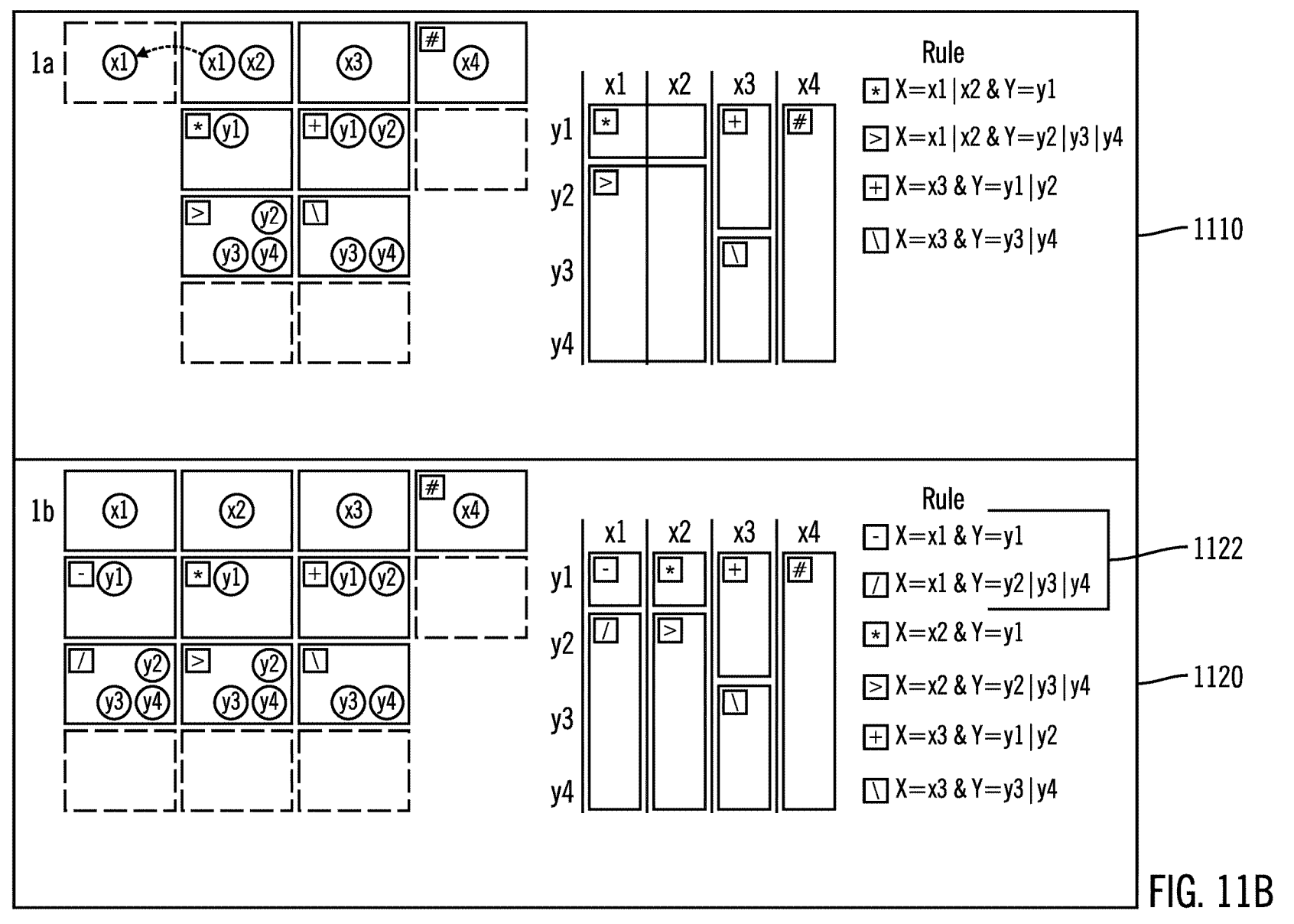
Figure 11C:
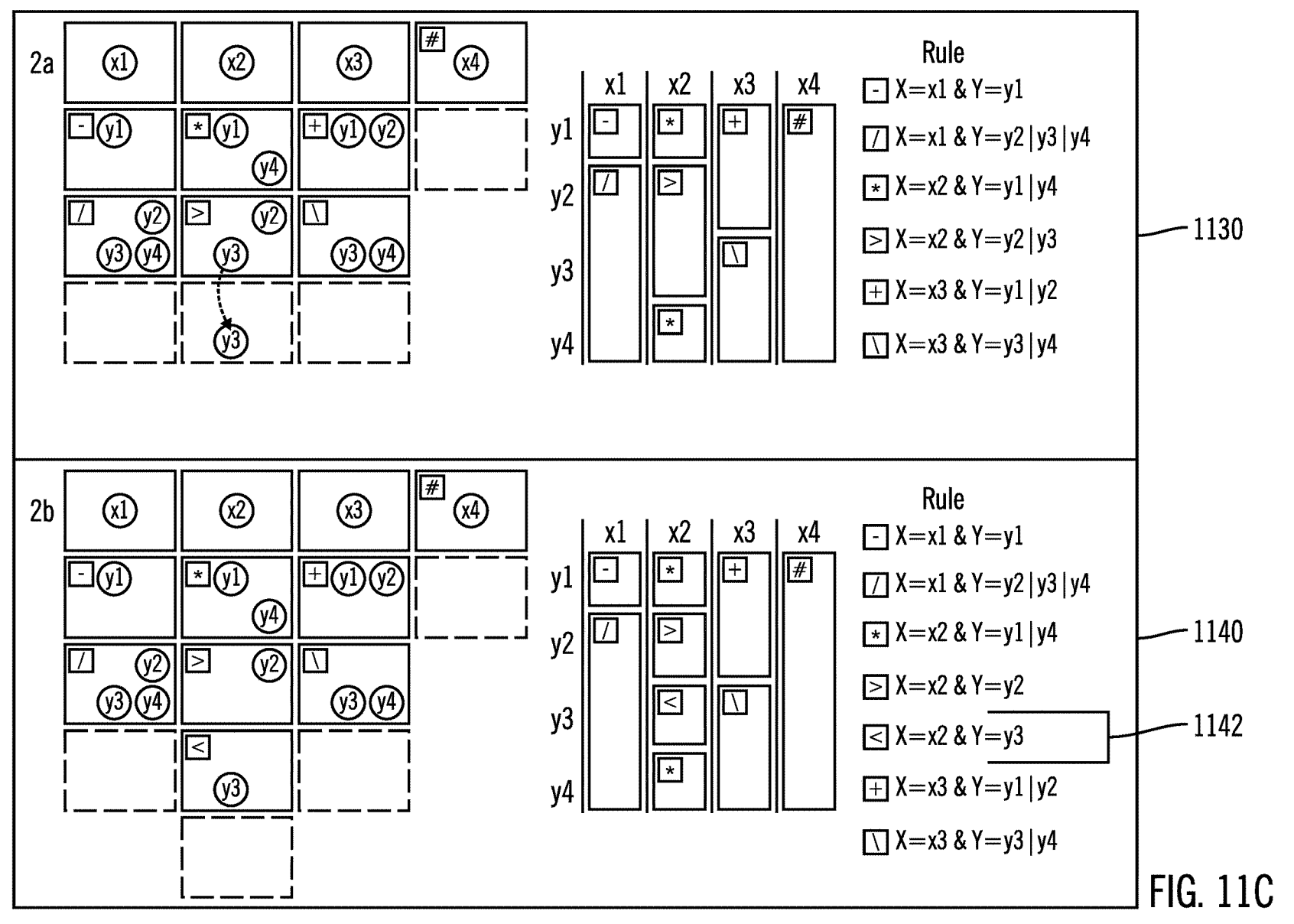
Figure 11D:
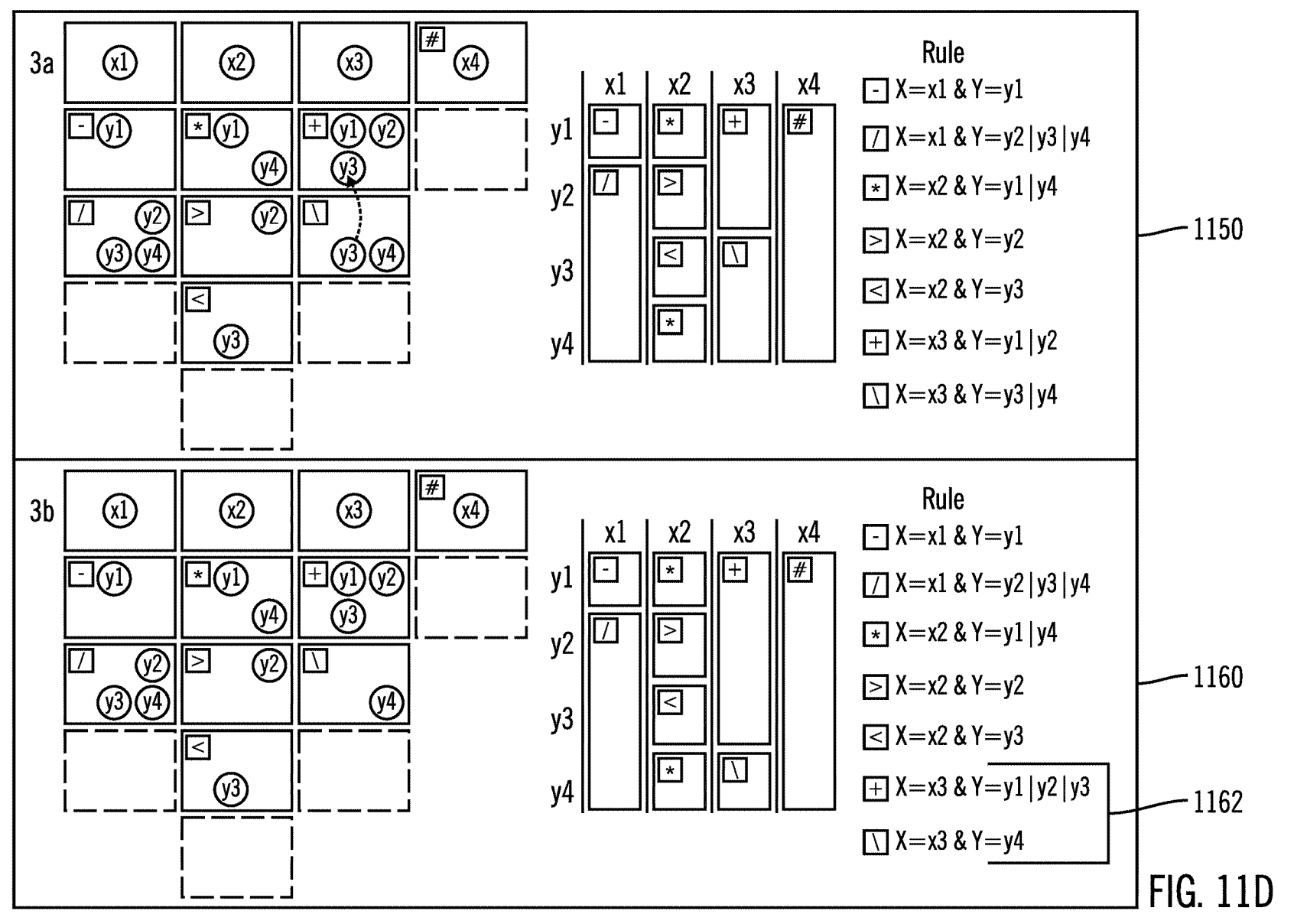
Figure 11E:
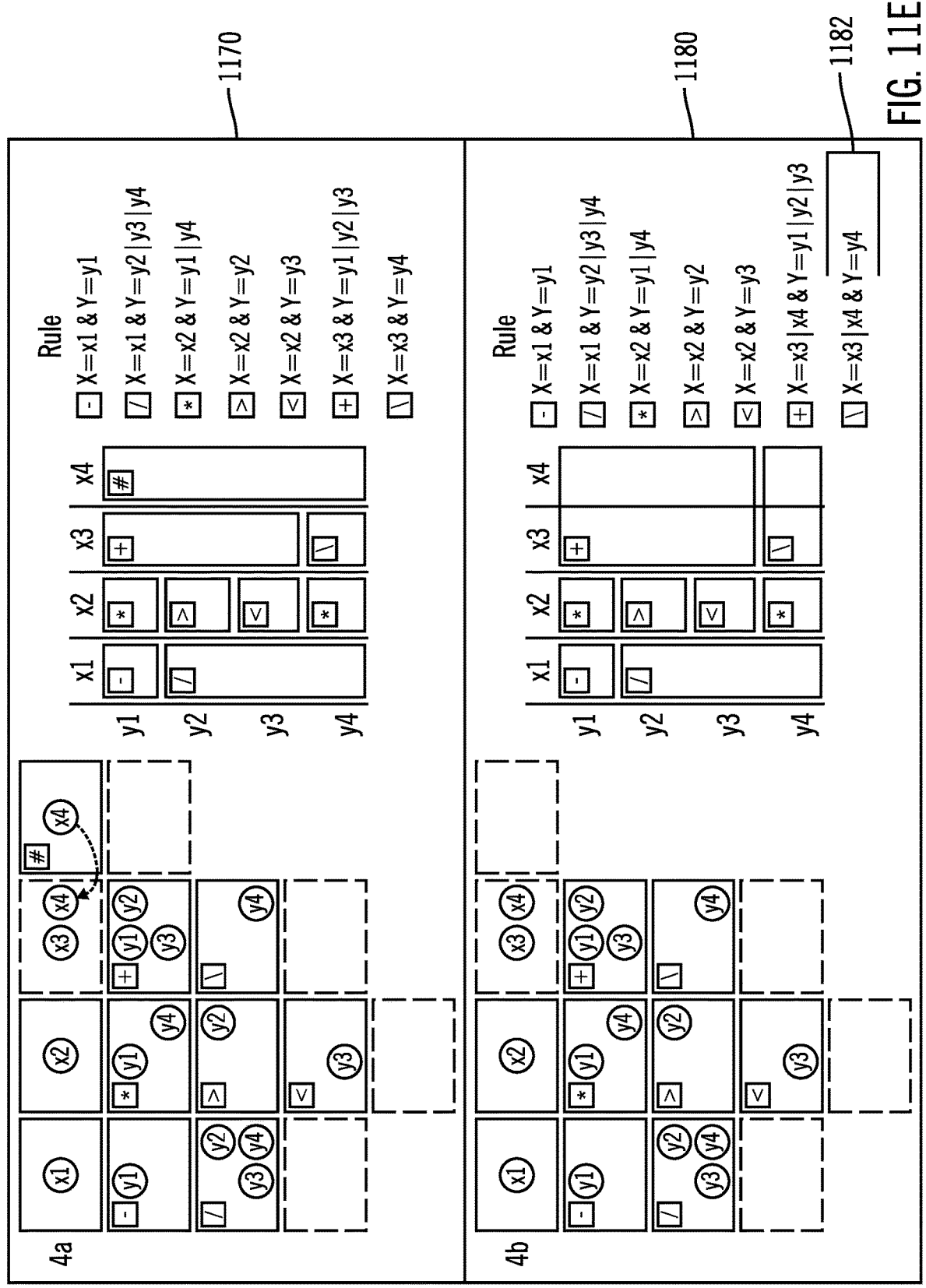

Just like an interactive split may be performed on both variables in play, so too can interactive merge. In FIG. 11D, images 3a 1150 and 3b 1160 illustrate that Y=y3—originally in group y3|y4—being merged with group y1|y2 under X=x3. The number of decision rules does not change, but the decision rules are updated. For this example, the updated decision rules 1162 (antecedents) are displayed in the rule column of image 3b 1160. In FIG. 11E, images 4a 1170 and 4b 1180 illustrate the merging of category x4 with category x3, with a modified decision rule 1182.

Upon adjustment of a single decision rule, the corresponding decision tree is updated as follows. Starting with the top modified decision rule condition, the IADR engine 110 determines the first modified decision rule condition and identifies the corresponding node in the original decision tree. Its parent node defines a root of a sub-tree in the original decision tree. The IADR engine 110 re-computes this sub-tree so that the modified decision rule becomes a path in the updated decision tree. One way to achieve this is to select all data records in a database defined by the parent node and filter out the data records corresponding to the modified condition. That is, the IADR engine 110 selects a subset of data records and reduces it to another subset of data records. A decision tree may then be generated with this subset of data records by using the variable from the modified condition as the first splitting variable for the decision tree. Such a sub-tree is attached to the parent node together with the modified condition and replaces the original sub-tree. This process is continued with every subsequent decision rule condition in the modified decision rule. When the processing is complete, the IADR engine 110 has an updated decision tree that contains the modified decision rule, and retains the original decision rules that are not affected by the adjustment.

With embodiments (A1), for a given parent node, the IADR engine 110 replaces the whole sub-tree rooted in the parent node with a new sub-tree and only a single node in the decision tree path corresponding to the given condition. In other embodiments (A2), for the parent node corresponding to the first modified decision rule condition, the IADR engine 110 replaces its sub-tree by the new sub-tree and the new path corresponding to the modified decision rule. That is, the IADR engine 110 replaces a part of the parent sub-tree that excludes the path defined by the modified decision rule for subsequent nodes.

With embodiments (B1), the sub-tree replacement is performed for the first modified decision rule condition and every decision rule condition after that. In other embodiments (B2), the sub-tree replacement is required only for nodes with modified decision rule conditions.

In various embodiments, embodiment (A1) utilizes embodiment (B1). In various embodiments, embodiment (A2) may be combined with either embodiment (B1) or embodiment (B2). While embodiment (B1) may build a more optimal tree, embodiment (B2) may enforce minimal tree changes.

The process described above is also applicable to the scenario where a set of decision rules is adjusted jointly. For example, with reference to FIG. 7, notice that the decision rule constraints below the first adjusted decision rule conditions (constraints T and U) typically correspond to a single original decision rule. The rest of the decision rules in the adjusted decision rule set are treated as having no such constraints and are just extended as appropriate. Additional constraints for other rules in the rule set may also be considered, but care is needed to keep the corresponding rules disjoint or consistent during the interactive adjustment process. The process of updating the decision tree may be extended to all such scenarios using the operations described herein.

Decision trees are typically used to predict the value of the target variable based on the available predictors. For each data record in a database, values of the predictors are used to determine the matching decision rule and predict the value of the target. Predicted values for all data records constitute a new field in a database. Using their domain knowledge and the system for interactive adjustment of decision rules, users may influence predictions recorded in the database.

FIG. 12 illustrates, in a flow chart, operations for providing suggestions in accordance with certain embodiments. Control begins at block 1200 with the IADR engine 110 receiving a modified decision rule with one or more decision rule conditions for adjusting an original decision tree, wherein at least one of the decision rule conditions has been modified. A modified decision rule condition indicates that the condition itself is modified. The updating of the decision tree may take the form of embodiment (B1). With embodiments, each of the one or more modified decision rule conditions is any of a remove decision rule condition, insert decision rule condition, and adjust decision rule condition. With embodiments, an extend decision rule condition is about growing the tree further and no additional tree updates are needed. In block 1202, the IADR engine 110 selects a first decision rule condition that has been modified and a corresponding decision tree node of the original decision tree. Thus, initially a modified decision rule condition is processed.

In block 1204, the IADR engine 110 selects data records from a database for a parent node and filters data records that match the decision rule condition. The parent node is a root of an original sub-tree of the original decision tree.

In block 1206, the IADR engine 110 generates a sub-tree on the selected data records with a first splitting variable from the decision rule condition.

In block 1208, the IADR engine 110 replaces an original sub-tree with the generated sub-tree originating at the parent node and the rule condition to form an adjusted decision tree. In particular, such replacement of one or more sub-trees adjusts the original decision tree to form the adjusted decision tree.

In block 1210, the IADR engine 110 determines whether there are more decision rule conditions to process. If so, processing continues to block 1212, otherwise, the original decision tree has been updated to form an adjusted decision tree and processing continues to block 1214. In block 1212, the IADR engine 110 selects a next decision rule condition and a corresponding decision tree node of the original decision tree. From block 1212, processing continues to block 1202. In block 1212, the next decision rule condition may be one that has been modified or one that has not been modified.

In block 1214, the IADR engine 110 displays a GUI with the adjusted decision tree, updated table, modified decision rule, updated measures, and updated suggestions. In block 1216, the IADR engine 110 uses the adjusted decision tree to predict a value of a target variable based on available predictors.

Embodiments adjust decision rules created from a decision tree. With embodiments, each decision rule corresponds to a branch in the decision tree. Embodiments allow interactive joint adjustments of decision rule conditions across two nodes for more accurate and suitable choices. Moreover, decision rule conditions within given nodes may be adjusted at any decision tree level, while the corresponding decision tree is updated accordingly. An optimal decision tree is preserved given specified adjustments. Relevant effects are available to the user through a set of respective visuals and metrics.

Embodiments look at a single decision tree at a time and the related decision rules. Embodiments enable users to interactively adjust a particular decision rule or a set of decision rules using visual reporting and tools. The reports indicate how measures, such as accuracy and support, change for adjusted decision rules as well as their effect on the overall decision tree. The latter is automatically adjusted according to the rule adjustments performed by the user.

Embodiments display a graphical user interface for two attributes based on the adjusted decision tree, a rule column with decision rules, and a table having cells corresponding to the decision rules, wherein input manipulating cells of the table adjusts one or more of the decision rules in a manner that enables the one or more of the decision rules to be represented with a decision tree structure. With embodiments, at least one of the decision rules includes a constraint that maintains decision rule conditions for one or more non-adjusted attributes. Additional embodiments automatically provide suggestions for any of adjusting the decision rules and for extending the decision rules to improve accuracy of the adjusted decision tree. Further embodiments update measures associated with the decision rules, wherein the measures indicate support and accuracy of the decision rules and indicate accuracy of the adjusted decision tree.

Figure 13:
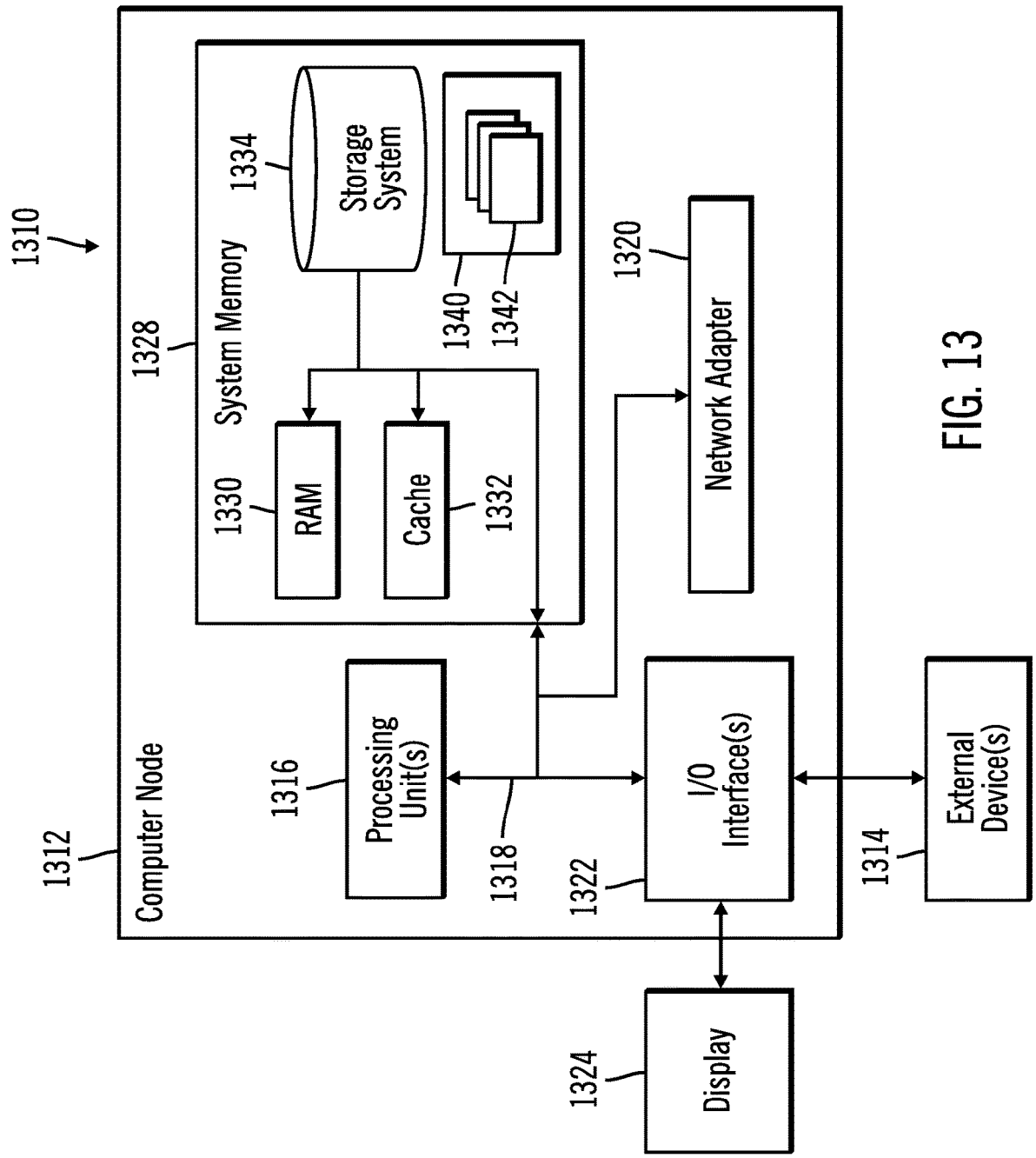
FIG. 13 illustrates a computing node in accordance with certain embodiments.

FIG. 13 illustrates a computing environment 1310 in accordance with certain embodiments. In certain embodiments, the computing environment is a cloud computing environment. Referring to FIG. 13, computer node 1312 is only one example of a suitable computing node and is not intended to suggest any limitation as to the scope of use or functionality of embodiments of the invention described herein. Regardless, computer node 1312 is capable of being implemented and/or performing any of the functionality set forth hereinabove.

The computer node 1312 may be a computer system, which is operational with numerous other general purpose or special purpose computing system environments or configurations. Examples of well-known computing systems, environments, and/or configurations that may be suitable for use with computer node 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1312 may be described in the general context of computer system executable instructions, such as program modules, being executed by a computer system. Generally, program modules may include routines, programs, objects, components, logic, data structures, and so on that perform particular tasks or implement particular abstract data types. Computer node 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer node 1312 is shown in the form of a general-purpose computing device. The components of computer node 1312 may include, but are not limited to, one or more processors or processing units 1316, a system memory 1328, and a bus 1318 that couples various system components including system memory 1328 to one or more processors or processing units 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1312 typically includes a variety of computer system readable media. Such media may be any available media that is accessible by computer node 1312, and it includes both volatile and non-volatile media, removable and non-removable media.

System memory 1328 can include computer system readable media in the form of volatile memory, such as random access memory (RAM) 1330 and/or cache memory 1332. Computer node 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, system memory 1328 may include at least one program product having a set (e.g., at least one) of program modules that are configured to carry out the functions of embodiments of the invention.

Program/utility 1340, having a set (at least one) of program modules 1342, may be stored in system memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer node 1312 may also communicate with one or more external devices 1314 such as a keyboard, a pointing device, a display 1324, etc.; one or more devices that enable a user to interact with computer node 1312; and/or any devices (e.g., network card, modem, etc.) that enable computer node 1312 to communicate with one or more other computing devices. Such communication can occur via Input/Output (I/O) interfaces 1322. Still yet, computer node 1312 can communicate with one or more networks such as a local area network (LAN), a general wide area network (WAN), and/or a public network (e.g., the Internet) via network adapter 1320. As depicted, network adapter 1320 communicates with the other components of computer node 1312 via bus 1318. It should be understood that although not shown, other hardware and/or software components could be used in conjunction with computer node 1312. Examples, include, but are not limited to: microcode, device drivers, redundant processing units, external disk drive arrays, RAID systems, tape drives, and data archival storage systems, etc.

In certain embodiments, the computing device 100 has the architecture of computer node 1012. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
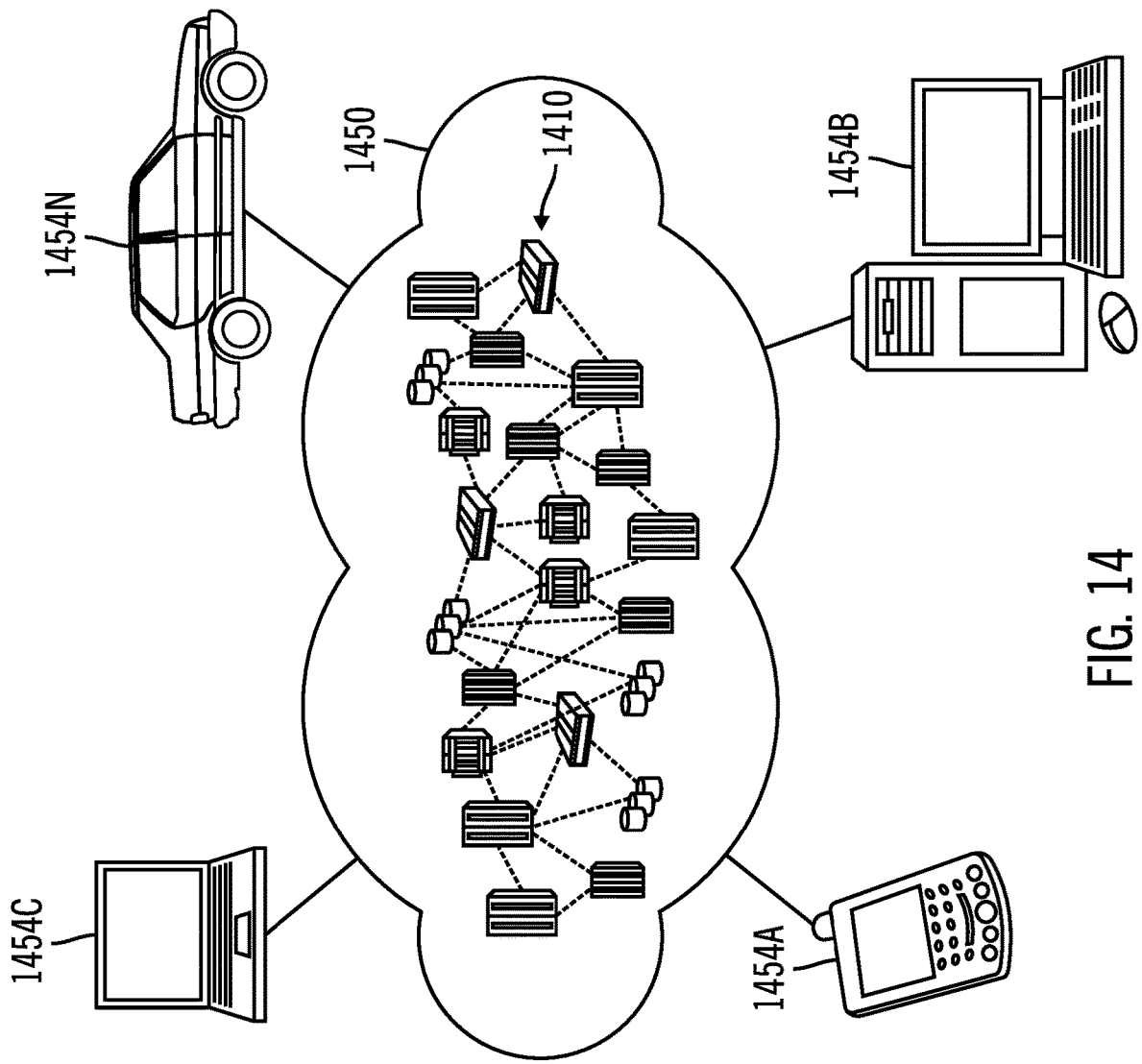
FIG. 14 illustrates a cloud computing environment in accordance with certain embodiments.

Referring now to FIG. 14, illustrative cloud computing environment 1450 is depicted. As shown, cloud computing environment 1450 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
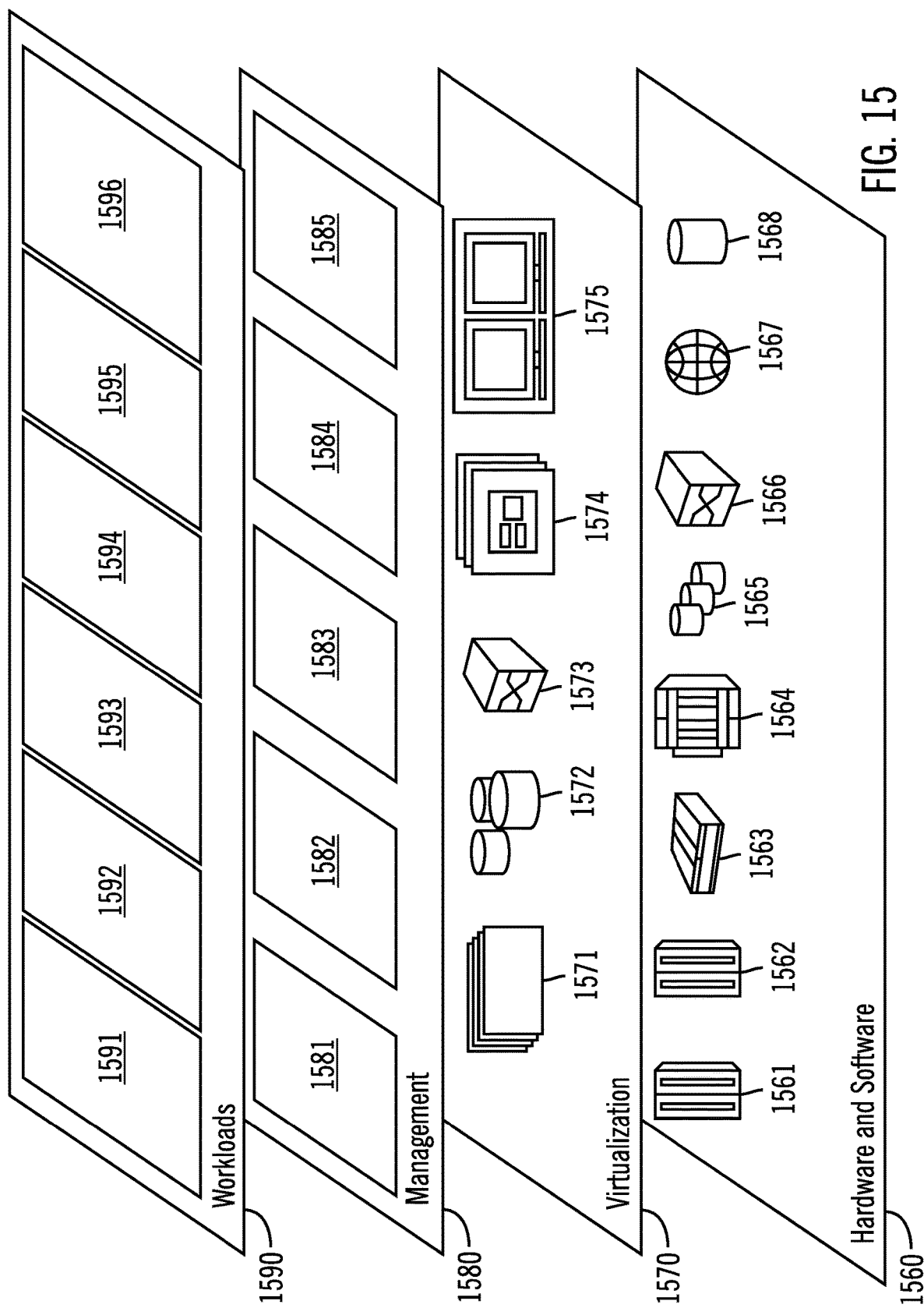
FIG. 15 illustrates abstraction model layers in accordance with certain embodiments.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and interactive adjustment of decision rules 1596

Thus, in certain embodiments, software or a program, implementing interactive adjustment of decision rules in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    receiving, using a processor of a computer, a modified decision rule with one or more decision rule conditions for adjusting an original decision tree, wherein at least one of the decision rule conditions has been modified;
    selecting a decision rule condition that has been modified and a corresponding decision tree node of the original decision tree;
    selecting data records from a database for a parent node of the corresponding decision tree node;
    filtering the selected data records that match the decision rule condition;
    generating a sub-tree using the filtered data records with a first splitting variable from the modified decision rule condition;
    replacing an original sub-tree with the generated sub-tree and the decision rule condition to form an adjusted decision tree;
    displaying a graphical user interface with the adjusted decision tree, the modified decision rule, and one or more suggestions for decision rules for two attributes jointly based on domain knowledge; and
    using the adjusted decision tree to predict a value of a target variable based on available predictors.

2. The computer-implemented method of claim 1, further comprising operations for:
    selecting a next decision rule condition and a corresponding decision tree node of the original decision tree, wherein the next decision rule condition is any of a decision rule condition that has been modified and a decision rule condition that has not been modified.

3. The computer-implemented method of claim 1, further comprising operations for:
    displaying the graphical user interface for the two attributes based on the adjusted decision tree, a rule column with decision rules, and a table having cells corresponding to the decision rules, wherein input manipulating cells of the table adjusts one or more of the decision rules in a manner that enables the one or more of the decision rules to be represented with a decision tree structure.

4. The computer-implemented method of claim 3, wherein at least one of the decision rules includes a constraint that maintains decision rule conditions for one or more non-adjusted attributes.

5. The computer-implemented method of claim 3, further comprising operations for:
    automatically providing the one or more suggestions for any of adjusting the decision rules and for extending the decision rules to improve accuracy of the adjusted decision tree.

6. The computer-implemented method of claim 3, further comprising operations for:
    updating measures associated with the decision rules, wherein the measures indicate support and accuracy of the decision rules and indicate accuracy of the adjusted decision tree.

7. The computer-implemented method of claim 1, wherein a Software as a Service (SaaS) is configured to perform the operations of the computer-implemented method.

8. A computer program product, the computer program product comprising a computer readable storage medium having program code embodied therewith, the program code executable by at least one processor to perform operations comprising:
    receiving a modified decision rule with one or more decision rule conditions for adjusting an original decision tree, wherein at least one of the decision rule conditions has been modified;
    selecting a decision rule condition that has been modified and a corresponding decision tree node of the original decision tree;
    selecting data records from a database for a parent node of the corresponding decision tree node;
    filtering the selected data records that match the decision rule condition;

generating a sub-tree using the filtered data records with a first splitting variable from the modified decision rule condition;

replacing an original sub-tree with the generated sub-tree and the decision rule condition to form an adjusted decision tree;

displaying a graphical user interface with the adjusted decision tree, the modified decision rule, and one or more suggestions for decision rules for two attributes jointly based on domain knowledge; and using the adjusted decision tree to predict a value of a target variable based on available predictors.

9. The computer program product of claim 8, wherein the program code is executable by the at least one processor to perform further operations comprising:

selecting a next decision rule condition and a corresponding decision tree node of the original decision tree, wherein the next decision rule condition is any of a decision rule condition that has been modified and a decision rule condition that has not been modified.

10. The computer program product of claim 8, wherein the program code is executable by the at least one processor to perform further operations comprising:

displaying the graphical user interface for the two attributes based on the adjusted decision tree, a rule column with decision rules, and a table having cells corresponding to the decision rules, wherein input manipulating cells of the table adjusts one or more of the decision rules in a manner that enables the one or more of the decision rules to be represented with a decision tree structure.

11. The computer program product of claim 10, wherein at least one of the decision rules includes a constraint that maintains decision rule conditions for one or more non-adjusted attributes.

12. The computer program product of claim 10, wherein the program code is executable by the at least one processor to perform further operations comprising:

automatically providing the one or more suggestions for any of adjusting the decision rules and for extending the decision rules to improve accuracy of the adjusted decision tree.

13. The computer program product of claim 10, wherein the program code is executable by the at least one processor to perform further operations comprising:

updating measures associated with the decision rules, wherein the measures indicate support and accuracy of the decision rules and indicate accuracy of the adjusted decision tree.

14. The computer program product of claim 8, wherein a Software as a Service (SaaS) is configured to perform the operations of the computer program product.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising:

receiving a modified decision rule with one or more decision rule conditions for adjusting an original decision tree, wherein at least one of the decision rule conditions has been modified;

selecting a decision rule condition that has been modified and a corresponding decision tree node of the original decision tree;

selecting data records from a database for a parent node of the corresponding decision tree node;

filtering the selected data records that match the decision rule condition;

generating a sub-tree using the filtered data records with a first splitting variable from the modified decision rule condition;

replacing an original sub-tree with the generated sub-tree and the decision rule condition to form an adjusted decision tree;

displaying a graphical user interface with the adjusted decision tree, the modified decision rule, and one or more suggestions for decision rules for two attributes jointly based on domain knowledge; and using the adjusted decision tree to predict a value of a target variable based on available predictors.

16. The computer system of claim 15, wherein the operations further comprise:

selecting a next decision rule condition and a corresponding decision tree node of the original decision tree, wherein the next decision rule condition is any of a decision rule condition that has been modified and a decision rule condition that has not been modified.

17. The computer system of claim 15, wherein the operations further comprise:

displaying the graphical user interface for the two attributes based on the adjusted decision tree, a rule column with decision rules, and a table having cells corresponding to the decision rules, wherein input manipulating cells of the table adjusts one or more of the decision rules in a manner that enables the one or more of the decision rules to be represented with a decision tree structure.

18. The computer system of claim 17, wherein at least one of the decision rules includes a constraint that maintains decision rule conditions for one or more non-adjusted attributes.

19. The computer system of claim 17, wherein the operations further comprise:

automatically providing the one or more suggestions for any of adjusting the decision rules and for extending the decision rules to improve accuracy of the adjusted decision tree.

20. The computer system of claim 15, wherein a Software as a Service (SaaS) is configured to perform the operations of the computer system.

* * * * *